United States Patent
Wang et al.

(10) Patent No.: US 10,541,839 B2
(45) Date of Patent: Jan. 21, 2020

(54) SYSTEM AND METHOD FOR ANGULAR-DOMAIN CHANNEL ESTIMATION OF MASSIVE MIMO SYSTEM WITH LOW-RESOLUTION ADC WITH TIME-VARYING THRESHOLDS

(71) Applicant: Mitsubishi Electric Research Laboratories, Inc., Cambridge, MA (US)

(72) Inventors: Pu Wang, Arlington, MA (US); Milutin Pajovic, Cambridge, MA (US); Philip Orlik, Cambridge, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/796,946

(22) Filed: Oct. 30, 2017

(65) Prior Publication Data
US 2019/0132156 A1    May 2, 2019

(51) Int. Cl.
*H04L 25/02* (2006.01)
*H04B 1/06* (2006.01)
*H04B 7/0413* (2017.01)

(52) U.S. Cl.
CPC ............ *H04L 25/024* (2013.01); *H04B 1/06* (2013.01); *H04B 7/0413* (2013.01)

(58) Field of Classification Search
CPC ....... H03M 1/007; H04B 1/06; H04B 7/0814; H04L 1/0045
See application file for complete search history.

(56) References Cited

U.S. PATENT DOCUMENTS

| | | | |
|---|---|---|---|
| 2018/0048377 A1* | 2/2018 | Gustavsson | H04B 1/16 |
| 2018/0069606 A1* | 3/2018 | Jung | H04B 7/0408 |
| 2018/0110007 A1* | 4/2018 | Park | H04W 52/0258 |

FOREIGN PATENT DOCUMENTS

CN    105959004 A  *  9/2016

OTHER PUBLICATIONS

Wang et al., "Quantization Design and Channel Estimation for Massive MIMO Systems with One Bit ADC's," ARXIV.org Cornell University Library, 201 Olin Library Cornell Univ. Ithaca, NY. Apr. 16, 2017.

(Continued)

*Primary Examiner* — Ross Varndell
(74) *Attorney, Agent, or Firm* — Gennadiy Vinokur; James McAleenan; Hironori Tsukamoto

(57) ABSTRACT

A receiver for use in a wireless communication system to receive signals transmitted over a wireless channel. The receiver includes a plurality of radio-frequency (RF) chains coupled a plurality of antennas. Each RF chain has at least one-bit analog-to-digital converter (ADC) to convert each measurement of an analog signal received by the antenna into at least one bit of information representing a result of a comparison of the measurement with a randomly selected threshold to produce a sequence of bits and a corresponding sequence of thresholds. Each bit in the sequence of bits represents a relative value of the measurement of the analog signal with respect to a threshold from the corresponding sequence of thresholds. A processor coupled to the plurality of RF chains estimates parameters of the wireless channel using the sequences of bits and the corresponding sequences of thresholds received from the plurality of RF chains.

15 Claims, 27 Drawing Sheets

(56) References Cited

OTHER PUBLICATIONS

Wang et al., "On Angular Domain Channel Estimation for One Bit Massive MIMO Systems with Fixed and Time Varying Thresholds." 2017 51st Asilomar Conference on Signals, Systems and Computers, IEEE. Oct. 29, 2017. pp. 1056-1060.

C. Risi, D. Persson, and E. G. Larsson, "Massive MIMO with 1-bit ADC," arXiv preprint, vol. arXiv:1404.7736, 2014.

L. Fan, S. Jin, C.-K.Wen, and H. Zhang, "Uplink achievable rate for massive MIMO systems with low-resolution ADC," IEEE Commun. Lett., vol. 19, No. 12, pp. 2186-2189, 2015.

J. Zhang, L. Dai, S. Sun, and Z. Wang, "On the spectral efficiency of massive MIMO systems with low-resolution ADCs," IEEE Commun. Lett., vol. 20, No. 5, pp. 842-845, 2016.

C.-K. Wen, C.-J. Wang, S. Jin, K.-K. Wong, and P. Ting, "Bayes-optimal joint channel-and-data estimation for massive MIMO with low-precision ADCs" IEEE Trans. Signal Process., vol. 64, No. 10, pp. 2541-2556, 2016.

J. Choi, J. Mo, and R. W. Heath, "Near maximum-likelihood detector and channel estimator for uplink multiuser massive MIMO systems with one-bit ADCs," IEEE Trans. Commun., vol. 64, No. 5, pp. 2005-2018, 2016.

\* cited by examiner

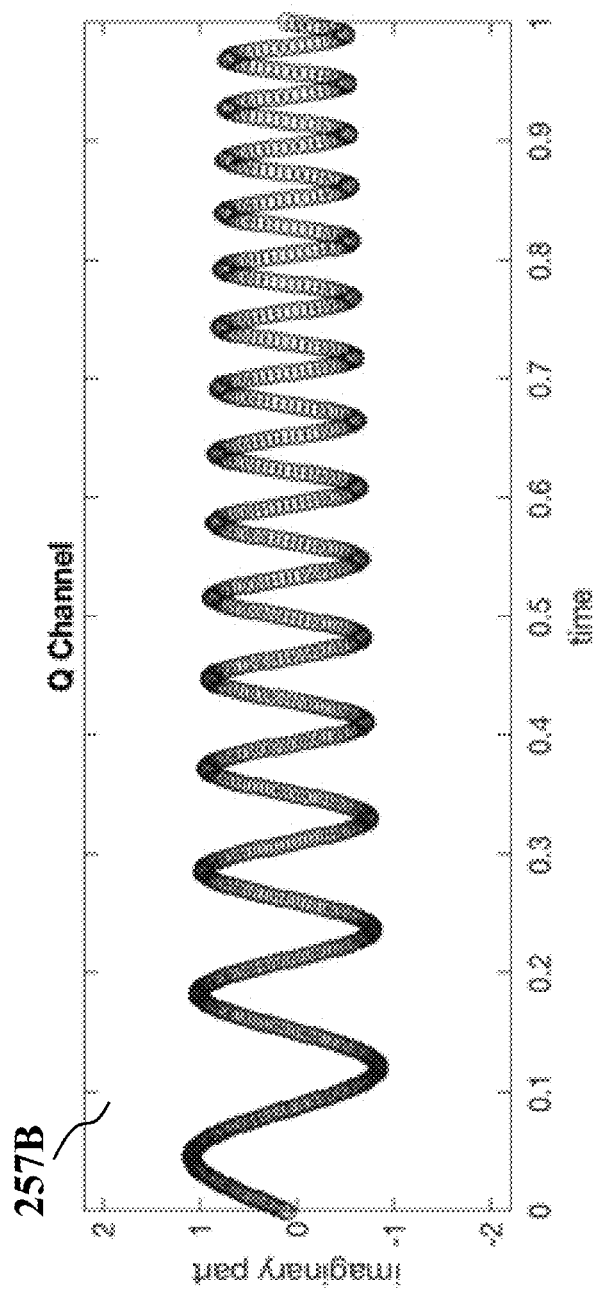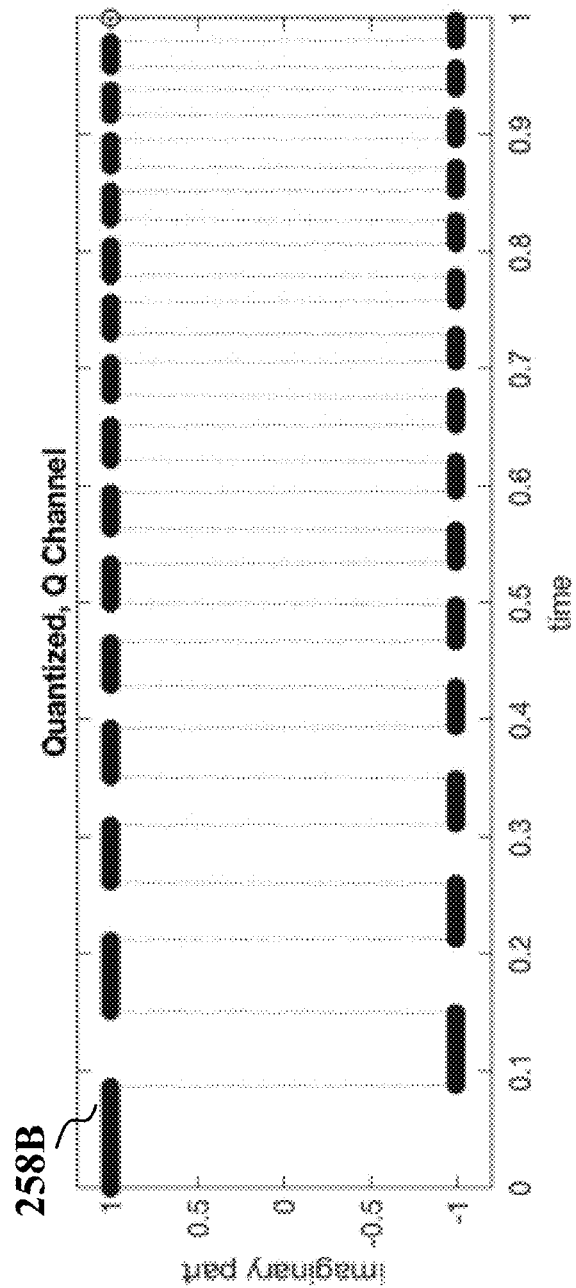

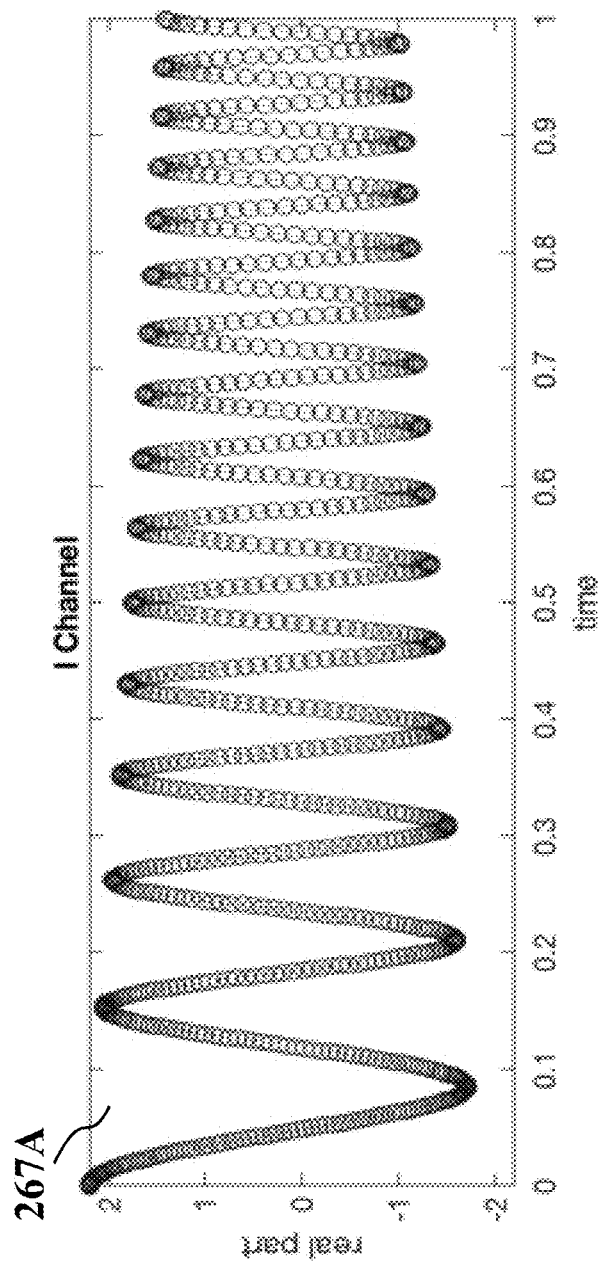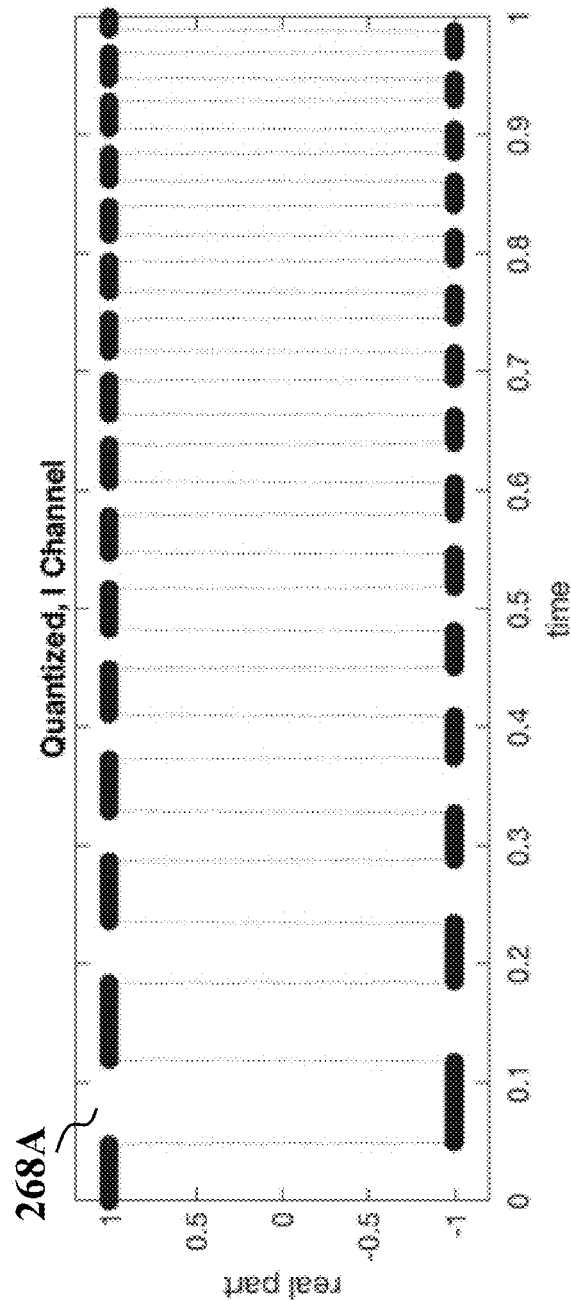
FIG. 2F
FIG. 2G

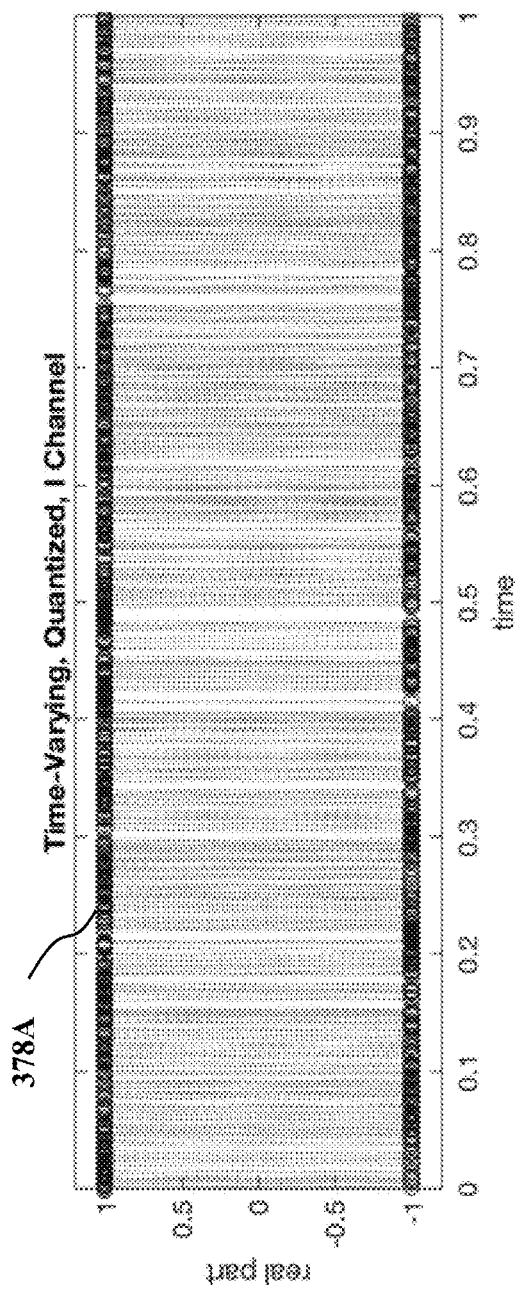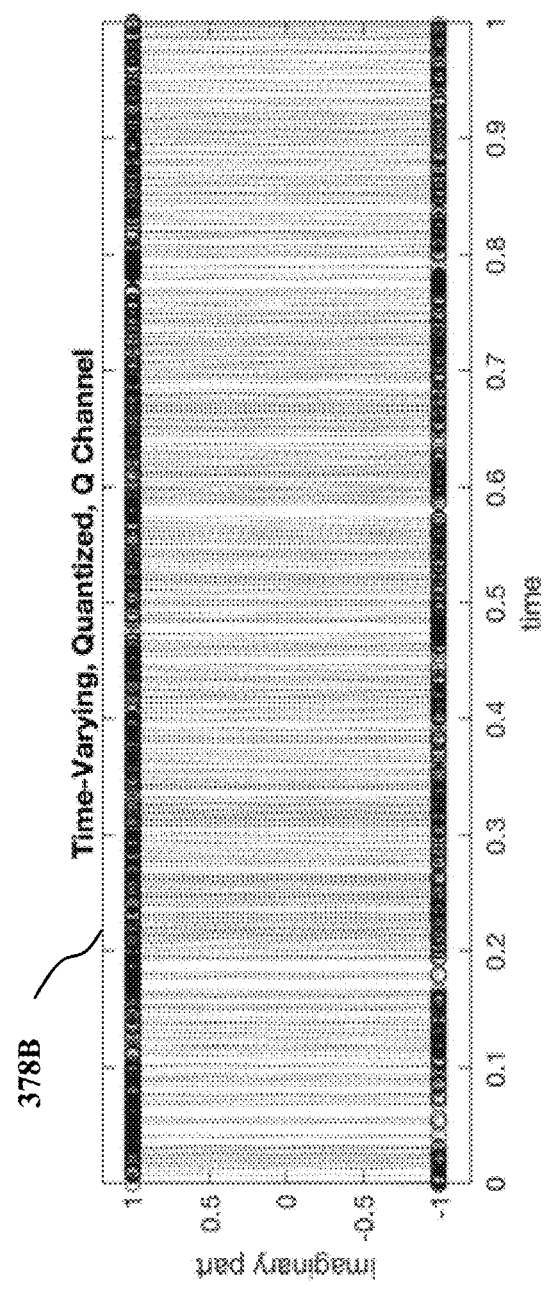

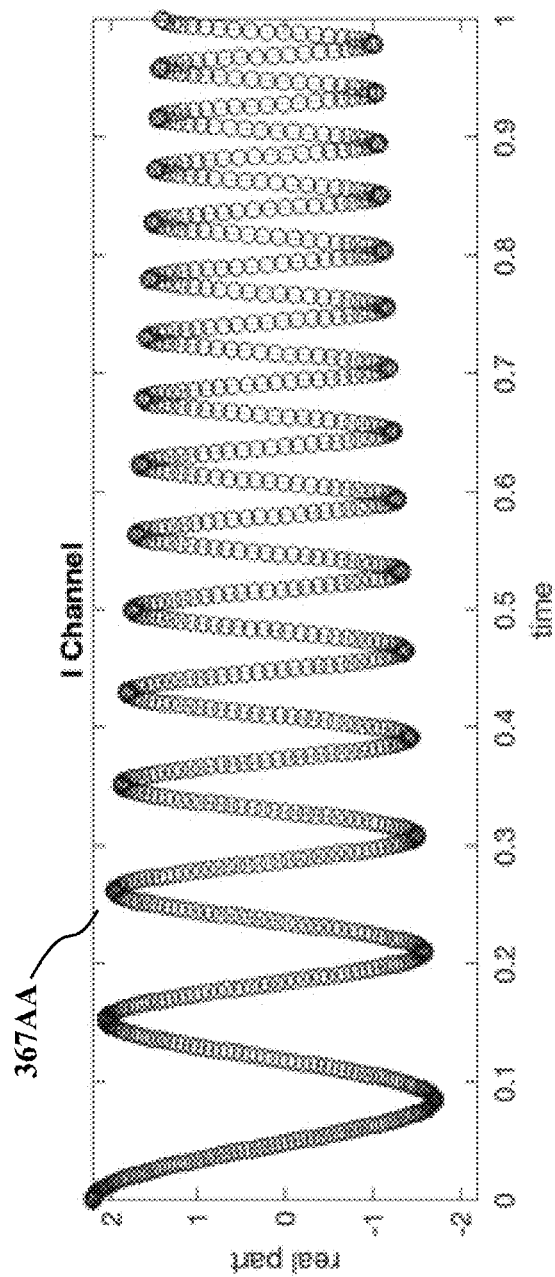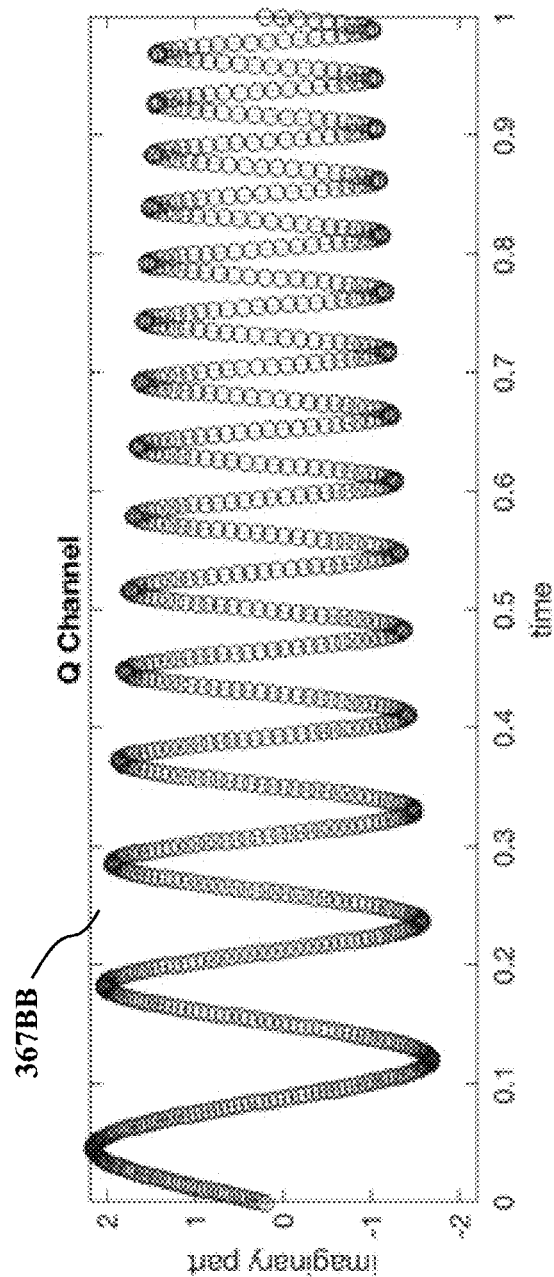

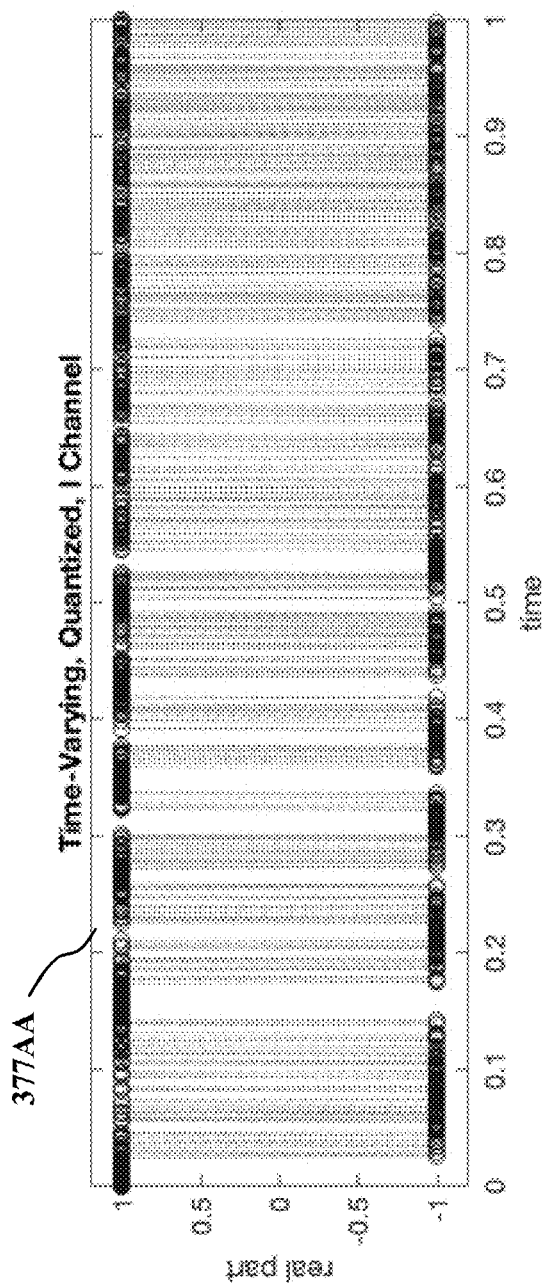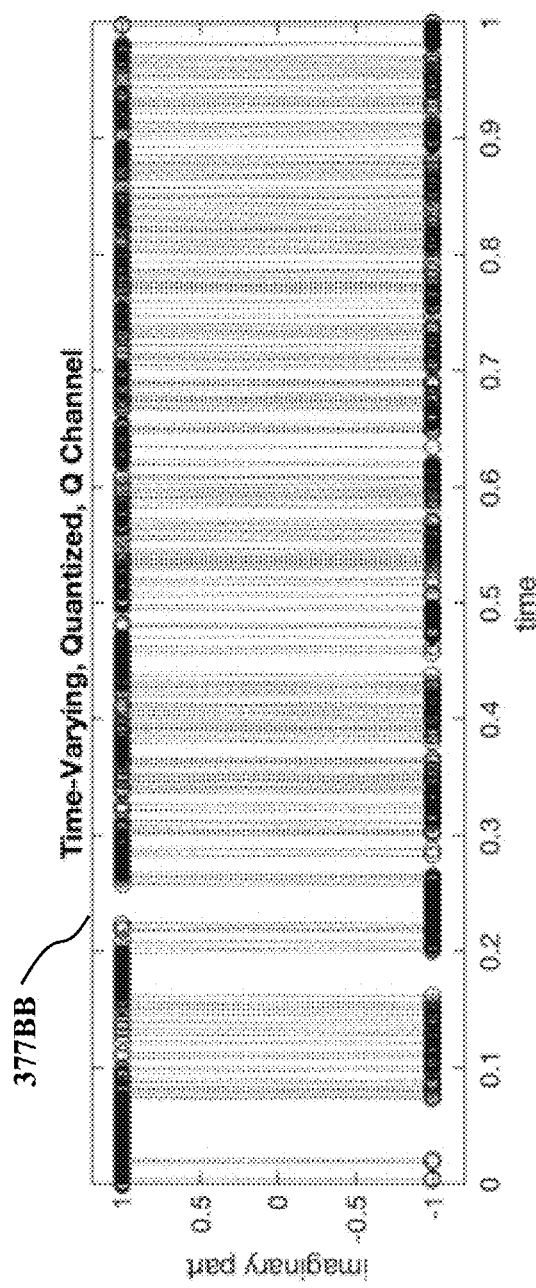

SYSTEM AND METHOD FOR ANGULAR-DOMAIN CHANNEL ESTIMATION OF MASSIVE MIMO SYSTEM WITH LOW-RESOLUTION ADC WITH TIME-VARYING THRESHOLDS

FIELD

The present disclosure relates to the field of multiple input, multiple output (MIMO) wireless communication systems, and more particularly to channel estimation to estimate information of angle-of-departure (AoD) and angle-of-arrival (AoA) of wireless channels.

BACKGROUND

The term "antenna array" refers to a geometrical arrangement of a number of antenna elements. The antenna elements can be configured as a single antenna unit to achieve a desired antenna gain and directional characteristics, such as a particular radiation pattern. A variation of this radiation pattern can be referred to as beam-forming. Antenna arrays can have applications, such as in multiple-input multiple-output (MIMO) communication systems. In particular, very large antenna arrays can be referred to as "massive MIMO arrays". Massive MIMO arrays may use several hundreds of antenna elements arranged in a single antenna unit and are considered to be a key technology component for future communication systems, such as fifth generation, 5G, communication. According to known technology, an up-link MIMO unit may comprise for example a radio base-station receiver, an analog-to-digital converter and automatic gain control units.

Massive MIMO can have some advantages, however, these advantages are counteracted, in practice, by an increased hardware complexity associated with having many antennas and many associated up/down conversion chains, and by an increased energy consumption due to all the hardware required for operation.

U.S. Pat. No. 9,705,579 provides a method with a complexity of using a MIMO system, while retaining some benefits as antenna selection, where a subset of size L taken from a set of N available antenna signals is selected and connected, via a switch, to L (L<N) radio-frequency (RF) chains. However, this method fails short in providing an amount of beamforming gain, and thus shows reduced or unacceptable performance, in particular, in channels with small angular spread, which typically occurs in conventional cellular systems.

In wireless communications, channel state information (CSI) refers to known channel properties of a communication link. This information describes how a signal propagates from the transmitter to the receiver and represents the combined effect of, for example, scattering, fading, and power decay with distance. The CSI makes it possible to adapt transmissions to current channel conditions for achieving reliable communication with high data rates in multi-antenna systems.

Most, conventional CSI estimation methods developed for traditional MIMO systems have a significantly more number of transmitters and receivers used at the base station, and are not always suitable for massive MIMO channel estimation due to the. The number of transceivers at the base station can potentially reach to thousands when the carrier frequency moves up to the millimeter wave frequency band which makes the physical size of the antennas much smaller, e.g., comparable to the wavelength.

SUMMARY

Embodiments of the present disclosure provide for devices and methods relating to the field of multiple input, multiple output (MIMO) wireless communication systems, and more particularly to channel estimation to estimate information of angle-of-departure (AoD) and angle-of-arrival (AoA) of wireless channels.

Some embodiments of the present disclosure are based on angular-domain channel estimation for massive MIMO systems with low-resolution analog-to-digital converters (ADCs) with few-bits quantization equipped at base stations in order to achieve lower power consumption and reduced hardware cost. Through experimentation, we realized that a major source of cost and energy consumption in massive multiple-input multiple-output (MIMO) antenna systems comes from digital-to-analog (DAC) and/or ADC converters. For example, due to a large number of antennas at the base stations (BSs), the hardware cost and power consumption at the BSs become simply unaffordable if each RF chain employs a power-hungry high-resolution ADC. To address this issue, some embodiments use low-resolution ADCs for the massive MIMO system, because the hardware complexity and power consumption grow exponentially with the resolution (i.e., the number of bits per measurement sample) of the ADC. In exemplar one-bit embodiment, the one-bit ADC simply compares the input analog signal with a threshold and requires minimum cost and power consumption.

In MIMO systems, a transmitter sends multiple signals by multiple transmit antennas. The transmit signals go through a matrix channel formed by various channel paths between the transmit antennas at the transmitter and the receive antennas at the receiver. Then, the receiver gets the received signal vectors of signals received by the multiple receive antennas and decodes the received signal vectors into the original information. However, the estimation of the parameters of the channel with quantized information produced by low-resolution ADCs is more difficult than with having higher-resolution information. Naturally, one bit of information per measurement produced by the one-bit ADCs is less informative that multiple bits produced by higher resolution ADCs.

Some embodiments are based on realization that one of the problems in the low in formativeness of an at least one-bit ADC, lies in the fact that the threshold for determining the value of the bit can be constant and selected to be statistically natural. For example, when the threshold is selected to be zero, the one bit of information representing a result of a comparison of the measurement with a zero-valued threshold indicates only a sign of the measurement, i.e., whether the measurements is positive or negative, but fails to report on the magnitude of the measurements.

To that end, some embodiments use time-varying thresholds, i.e., the thresholds allowed to have different values at different time steps. Those embodiments are based on insight that one-bit value indicating the result of the comparison of the measurements of the signal with a randomly selected threshold, as well as the value of the randomly selected threshold carries additional statistical information that can be used for channel estimation.

For example, if the result of comparison indicates that the measurement of the signal is greater than a threshold having a value, let say, three, that one bit of information indicating that the signal is greater than three carries statistically more information than one bit of information indicating that the signal is greater than zero, i.e., positive. Notably, the values of the time varying thresholds needs to be preserved in order to take advantage of the knowledge of the values of the threshold. However, the memory preserving such information can be shared across multiple RF chains and/or reused for other computational needs of the MIMO system.

Further, the low-resolution ADCs sampling the analog signals with time-varying thresholds can reduce the cost of the massive MIMO system, while allowing using multiple RF chains in recovering transmitted data and/or parameters of the wireless channel.

For example, one embodiment discloses a receiver for use in a wireless communication system to receive signals transmitted over a wireless channel. The receiver includes a plurality of antennas and a plurality of radio-frequency (RF) chains coupled the plurality of antennas. Each RF chain includes an at least one-bit ADC to convert each measurement of an analog signal received by the antenna into one bit of information representing a result of a comparison of the measurement with a randomly selected threshold to produce a sequence of bits and a corresponding sequence of thresholds. Wherein each bit in the sequence of bits represents a relative value of the measurement of the analog signal with respect to a threshold from the corresponding sequence of thresholds. A processor can be coupled to the plurality of RF chains can estimate at least some parameters of the wireless channel using the sequences of bits and the corresponding sequences of thresholds received from the plurality of RF chains.

As used herein, randomly selected thresholds are selected independently from the values of the measurements themselves. However, in various embodiments, the randomness of the threshold can be truly random, pseudo-random, as well as uniformly random or random according to a probability density function.

For example, in some embodiments, the receiver includes a random-number generator to generate a random number within a predetermined range. The predetermined range is defined by the possible values of the signal allowing the processor to select the threshold based on the random number. In one embodiment, the processor uses the random number itself as a threshold. This embodiment allows to increase the variation of the threshold selection and advantageous for MIMO system with different variations of the transmitted signals.

Further, in some embodiments the processor can use the random number to select a threshold from a set of thresholds representing the quantized space of the thresholds. Wherein this embodiment allows considering the possible values of the thresholds based on the types of the transmitted signals. For example, the set of thresholds can include more positive value than the negative to reflect the believe on distribution of the values. In another example, the set of thresholds can include at least two elements with the same value, e.g., zero values, to represent statistical tendency, which allows increasing the range of the threshold values to collect the information about measurement outliers of the transmitted signal.

Further still, in some embodiments of the present disclosure, the values of the elements in a set of thresholds can be sampled according to a probability distribution function. Wherein, in one implementation, the processor estimates a probability distribution function reflecting a density of the transmitted signal. Such probability distribution function can be estimated based on relative values of the measurements with respect to the thresholds. Selecting the thresholds using the probability distribution function can increase statistical value of the one-bit samples of the measurements.

In some embodiments, for each time step, the processor selects the same threshold for all RF chains. Wherein this embodiment can allow for sharing the same sequence of thresholds for different RF chains. Alternative embodiments, however, can select different thresholds for at least some different RF chains. For example, in one implementation, the processor selects a pattern of thresholds repeated form multiple groups of RF chains connected to neighboring antennas.

According to an embodiment of the present disclosure, a receiver for use in a wireless communication system to receive signals transmitted over a wireless channel. The receiver including a plurality of antennas. A plurality of RF chains coupled the plurality of antennas. Each RF chain includes an at least one-bit ADC to convert each measurement of an analog signal received by the antenna into at least one bit of information representing a result of a comparison of the measurement with a randomly selected threshold to produce a sequence of bits and a corresponding sequence of thresholds. Wherein each bit in the sequence of bits represents a relative value of the measurement of the analog signal with respect to a threshold from the corresponding sequence of thresholds. A processor coupled to the plurality of RF chains to estimate at least some parameters of the wireless channel using the sequences of bits and the corresponding sequences of thresholds received from the plurality of RF chains.

According to an embodiment of the present disclosure, a symbol detector for use in a communication system to receive signals transmitted over a wireless channel. The symbol detector including a plurality of antennas. A plurality of RF chains coupled the plurality of antennas, each RF chain includes an at least one-bit ADC to convert each measurement of an analog signal received by the antenna into at least one bit of information representing a result of a comparison of the measurement with a randomly selected threshold to produce a sequence of bits and a corresponding sequence of thresholds. Wherein each bit in the sequence of bits represents a relative value of the measurement of the analog signal with respect to a threshold from the corresponding sequence of thresholds. A processor in communication with a memory, coupled to the plurality of RF chains to detect a sequence of symbols sent from multiple transmitters from the quantized measurements from multiple receivers, aided by an estimated channel state information (CSI).

According to an embodiment of the present disclosure, a decoder for use in a communication system to receive signals transmitted over a wireless channel. The decoder including a plurality of antennas. A plurality of RF chains coupled the plurality of antennas. Each RF chain includes an at least one-bit ADC to convert each measurement of an analog signal received by the antenna into at least one bit of information representing a result of a comparison of the measurement with a randomly selected threshold to produce a sequence of bits and a corresponding sequence of thresholds. Wherein each bit in the sequence of bits represents a relative value of the measurement of the analog signal with respect to a threshold from the corresponding sequence of thresholds. A processor in communication with a memory, coupled to the plurality of RF chains to estimate at least some parameters of the wireless channel using the sequences of bits and the corresponding sequences of thresholds received from the plurality of RF chains. Such that the at least some parameters include a two-dimensional channel matrix having one or combination of angles-of-departure, angles-of-arrival, and channel path gains.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B shows an example of the analog I-channel baseband waveform of FIG. 2A, FIG. 2C is comparing the analog I-channel baseband waveform with Threshold $\lambda_1$ of FIG. 2A, according to some embodiments of the present disclosure;

FIG. 2D and FIG. 2E show graphs illustrating an example of the Q-channel quantization with a fixed threshold at zero, FIG. 2D shows an example of the analog Q-channel baseband waveform of FIG. 2A, and FIG. 2E is comparing the analog Q-channel baseband waveform with Threshold $\lambda_2$ of FIG. 2A, wherein the outputs are +1 if the signal is larger than zero (FIG. 2A), and −1 if the signal is less than zero (FIG. 2A), according to some embodiments of the present disclosure;

FIG. 2F and FIG. 2G, FIG. 2F shows a graph illustrating the same analog I-channel baseband signal of FIG. 2B, except the amplitude is multiplied by 2. FIG. 2G shows the quantized I-channel baseband signal by comparing the FIG. 2F graph with the zero, according to some embodiments of the present disclosure;

FIG. 2I shows the quantized Q-channel baseband signal by comparing the FIG. 2H graph with the zero, according to some embodiments of the present disclosure;

FIG. 4C is a graph illustrating the quantized I-channel baseband signal by comparing the signal of graph 357AA of FIG. 4A, with the thresholds in graph 373A of FIG. 3D, according to some embodiments of the present disclosure;

FIG. 4D is a graph illustrating the quantized Q-channel baseband signal by comparing the signal of graph 357BB of FIG. 4D, with the thresholds in graph 373B of FIG. 3E, according to some embodiments of the present disclosure;

FIG. 4E is a graph illustrating the same analog I-channel baseband signal of graph 267A of FIG. 2F, according to some embodiments of the present disclosure;

FIG. 4F is a graph illustrating the same analog Q-channel baseband signal of graph 267B of FIG. 2H, according to some embodiments of the present disclosure;

FIG. 4G is a graph illustrating the quantized I-channel baseband signal by comparing the signal of graph 367AA of FIG. 4E, with the thresholds in graph 373A of FIG. 3D, according to some embodiments of the present disclosure;

FIG. 4H is a graph illustrating the quantized Q-channel baseband signal by comparing the signal of graph 367BB of FIG. 4F, with the thresholds in graph 373B of FIG. 3E, according to some embodiments of the present disclosure;

Figure 1A:
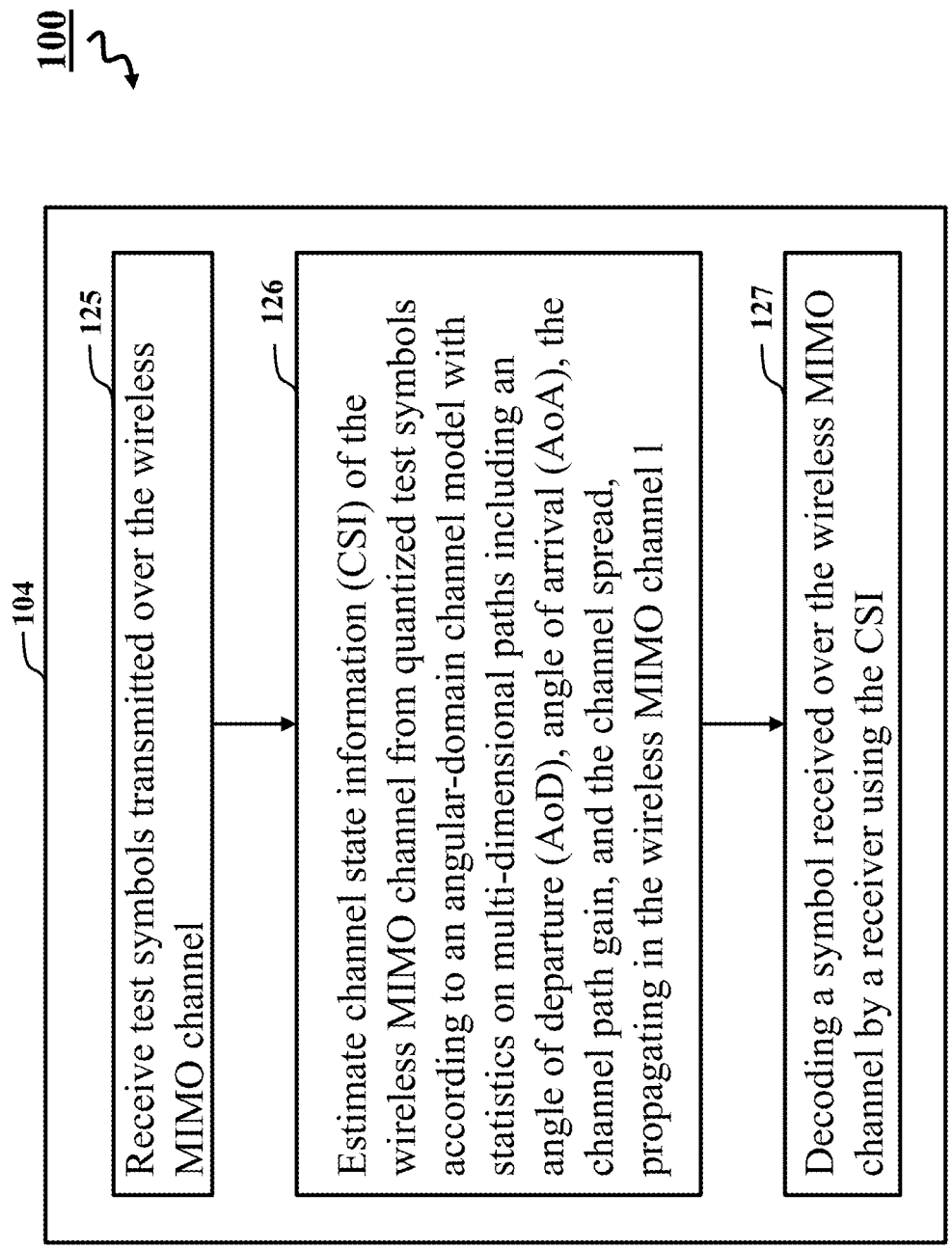
FIG. 1A shows a block diagram of some methods of an embodiment for a wireless communication system, according to one embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for devices and methods relating to multiple input, multiple output (MIMO) wireless communication systems, in particular, to channel estimation to estimate information of angle-of-departure (AoD) and angle-of-arrival (AoA) of wireless channels.

Some embodiments of the present disclosure are based on angular-domain channel estimation for massive MIMO systems with one-bit analog-to-digital converters (ADCs) equipped at base stations in order to achieve lower power consumption and reduced hardware cost. Through experimentation, we realized a major source of cost and energy consumption in massive multiple-input multiple-output (MIMO) antenna systems comes from digital-to-analog (DAC) and/or analog-to-digital (ADC) converters. For example, due to a large number (hundreds or even thousands) of antennas at the base stations (BSs), the hardware cost and power consumption at the BSs become simply unaffordable if each RF chain employs a power-hungry high-resolution ADC. To address this issue, some embodiments use low-resolution ADCs for the massive MIMO system, because the hardware complexity and power consumption grow exponentially with the resolution (i.e., the number of bits per measurement sample) of the ADC. In exemplar one-bit embodiment, the one-bit ADC simply compares the input analog signal with a threshold and requires minimum cost and power consumption.

Some embodiments are based on realization that one of the problems in the low in formativeness of the one-bit ADC, lies in the fact that the threshold for determining the value of the bit can be constant and selected to be statistically natural. For example, when the threshold is selected to be zero, the one bit of information representing a result of a comparison of the measurement with a zero-valued threshold indicates only a sign of the measurement, i.e., whether the measurements is positive or negative, but fails to report on the magnitude of the measurements.

To that end, some embodiments use time-varying thresholds, i.e., the thresholds allowed to have different values at different time steps. Those embodiments are based on insight that one-bit value indicating the result of the comparison of the measurements of the signal with a randomly selected threshold, as well as the value of the randomly selected threshold carries additional statistical information that can be used for channel estimation.

For example, if the result of comparison indicates that the measurement of the signal is greater than a threshold having a value, let say, three, that one bit of information indicating that the signal is greater than three carries statistically more information than one bit of information indicating that the signal is greater than zero, i.e., positive. Notably, the values of the time varying thresholds needs to be preserved in order to take advantage of the knowledge of the values of the threshold. However, the memory preserving such information can be shared across multiple RF chains and/or reused for other computational needs of the MIMO system. Further, the one-bit ADCs sampling the analog signals with time-varying thresholds can reduce the cost of the massive MIMO system, while allowing using multiple RF chains in recovering transmitted data and/or parameters of the wireless channel.

For example, one embodiment discloses a receiver for use in a wireless communication system to receive signals transmitted over a wireless channel. The receiver includes a plurality of antennas and a plurality of radio-frequency (RF) chains coupled the plurality of antennas. Each RF chain includes a one-bit analog-to-digital converter (ADC) to convert each measurement of an analog signal received by the antenna into one bit of information representing a result of a comparison of the measurement with a randomly selected threshold to produce a sequence of bits and a corresponding sequence of thresholds. Wherein each bit in the sequence of bits represents a relative value of the measurement of the analog signal with respect to a threshold from the corresponding sequence of thresholds. A processor can be coupled to the plurality of RF chains can estimate at least some parameters of the wireless channel using the sequences of bits and the corresponding sequences of thresholds received from the plurality of RF chains. As used herein, randomly selected thresholds are selected independently from the values of the measurements themselves. However, in various embodiments, the randomness of the threshold can be truly random, pseudo-random, as well as uniformly random or random according to a probability density function.

For example, in some embodiments, the receiver includes a random-number generator to generate a random number within a predetermined range. The predetermined range is defined by the possible values of the signal allowing the processor to select the threshold based on the random number. In one embodiment, the processor uses the random number itself as a threshold. This embodiment allows to increase the variation of the threshold selection and advantageous for MIMO system with different variations of the transmitted signals.

Further, in some embodiments the processor can use the random number to select a threshold from a set of thresholds representing the quantize space of the thresholds. Wherein this embodiment allows considering the possible values of the thresholds based on the types of the transmitted signals. For example, the set of thresholds can include more positive value than the negative to reflect the believe on distribution of the values. In another example, the set of thresholds can include at least two elements with the same value, e.g., zero values, to represent statistical tendency, which allows increasing the range of the threshold values to collect the information about measurement outliers of the transmitted signal.

Further still, in some embodiments of the present disclosure, the values of the elements in set of thresholds can be sampled according to a probability distribution function. Wherein, in one implementation, the processor estimates a probability distribution function reflecting a density of the transmitted signal. Such probability distribution function can be estimated based on relative values of the measurements with respect to the thresholds. Selecting the thresholds using the probability distribution function can increase statistical value of the one-bit samples of the measurements.

In some embodiments, for each time step, the processor selects the same threshold for all RF chains. Wherein this embodiment can allow for sharing the same sequence of thresholds for different RF chains. Alternative embodiments, however, can select different thresholds for at least some different RF chains. For example, in one implementation, the processor selects a pattern of thresholds repeated form multiple groups of RF chains connected to neighboring antennas.

FIG. 1A shows a block diagram of method steps of an embodiment for a wireless communication system in accordance with one embodiment of the present disclosure. The computer implemented method 100 is for decoding a symbol transmitted over a wireless MIMO channel by a first communication device, and begins with step 125 of FIG. 1A, that includes a second communication device 104 receiving a test symbol transmitted over the wireless channel.

Step 126 of FIG. 1A for method 100 includes the communication device 104 estimating the channel state information (CSI) of the wireless MIMO channel from quantized test symbol according to an angular-domain channel model with statistics on multi-dimensional paths including an angle of departure (AoD), angle of arrival (AoA), the channel path gain, the channel spread, propagating in the wireless MIMO channel.

Step 127 of FIG. 1A for method 100 includes encoding a symbol received over the wireless MIMO channel by a receiver using the CSI.

Figure 1B:
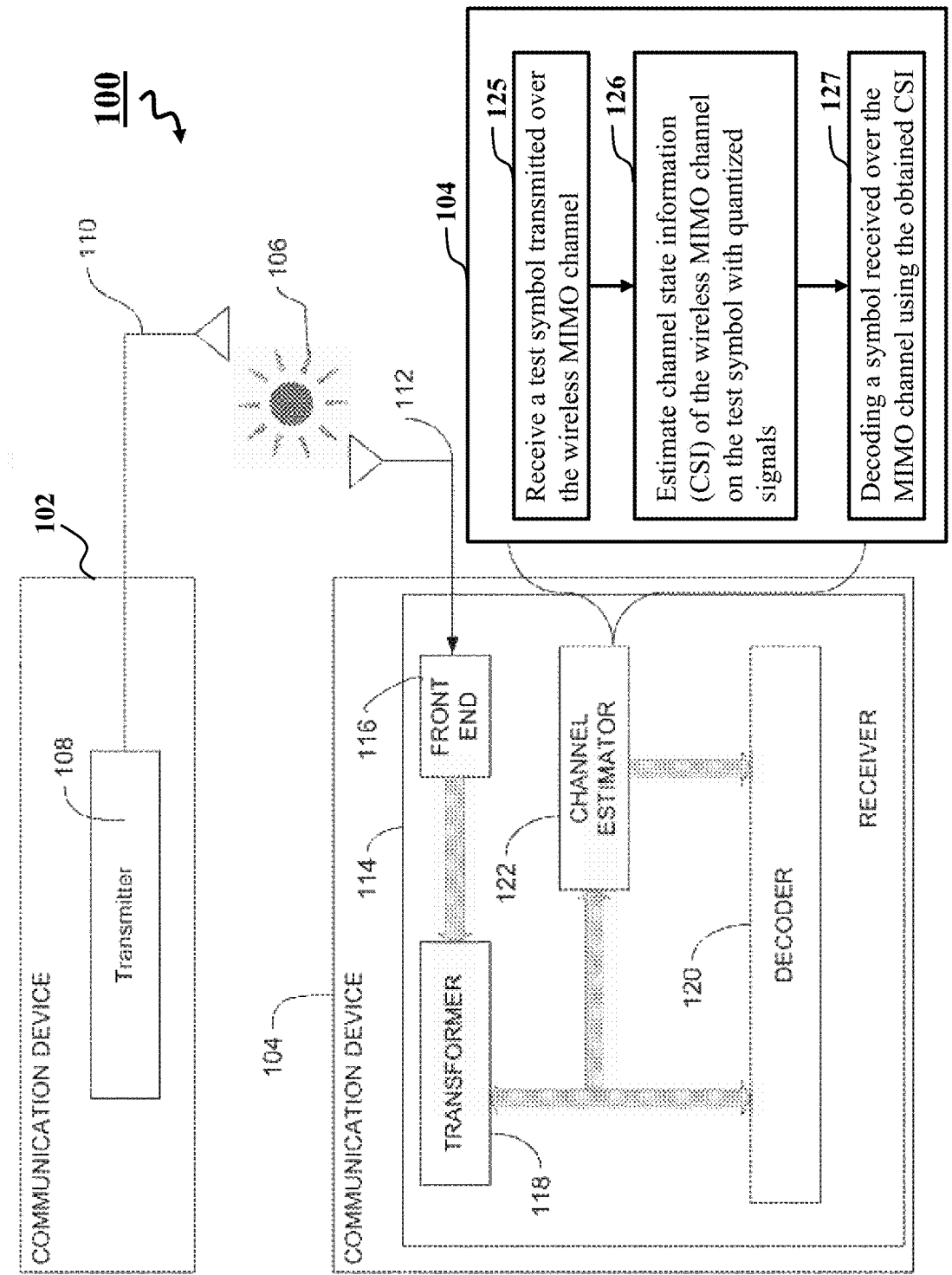
FIG. 1B shows a schematic of a wireless communication system including some components and some method steps, according to some embodiments of the present disclosure.

FIG. 1B shows a schematic of a wireless communication system 100 in accordance with one embodiment of the present disclosure. The communication system 100 includes the first communication device 102 able to communicate with the second communication device 104 over a communication channel 106. The communication channel 106 is a wireless MIMO channel. The channel can cover a wide frequency spectrum from 1 GigaHertz (GHz) to 300 GHz or beyond 300 GHz. For example, the first communication device 102 and/or the second communication device 104 can communicate with each other in accordance with the 802.11ad standard.

For example, the device 102 includes Ntx antennas 110 and the device 104 includes Nrx antennas 112 to transmit a single data stream over the channel 106 by a single antenna or over multiple antennas using beamforming and/or spatial multiplexing. The single data stream can be split into multiple sub-data streams that are then individually and simultaneously transmitted over the same communication channel such as channel 106 from the multiple antennas. Although the scope of the present disclosure is not limited in this respect, types of antennas used by various embodiments for antennas 110 and/or 112 include but are not limited to internal antenna, dipole antenna, omni-directional antenna, a monopole antenna, an end fed antenna, a circularly polarized antenna, a micro-strip antenna, a diversity antenna and the like.

The communication device 102 includes a transmitter 108 to transmit a beam-formed transmission by transmitting the data stream via Ntx antennas 110, respectively. The communication device 104 includes a receiver 114 to receive the data stream over the channel 106 via the Nrx antennas 112. The received signal may include symbols corresponding, for example, to symbols of the signal transmitted by transmitter 108.

In some embodiments, the receiver 114 includes a front end 116 and/or a transformer 118. The front end 116 can include any suitable front end module to convert a time-domain signal received from antenna 112 into a time-domain signal of a format suitable for transformer 118. Transformer 118 may transform the signal into a plurality of different types of signals that are suitable for a decoder 120 or a channel estimator 122. For example, the frond end can convert the received signal into a symbol suitable for the decoding.

The receiver 114 also includes a channel estimator 122 to generate a signal representing channel estimation. The receiver 114 can also include a decoder 120 to decode the received signal and to generate signal representing an estimation of the signal transmitted by the device 102. The channel estimator 122 uses a probabilistic model in the environment of the channel 106.

Figure 1C:
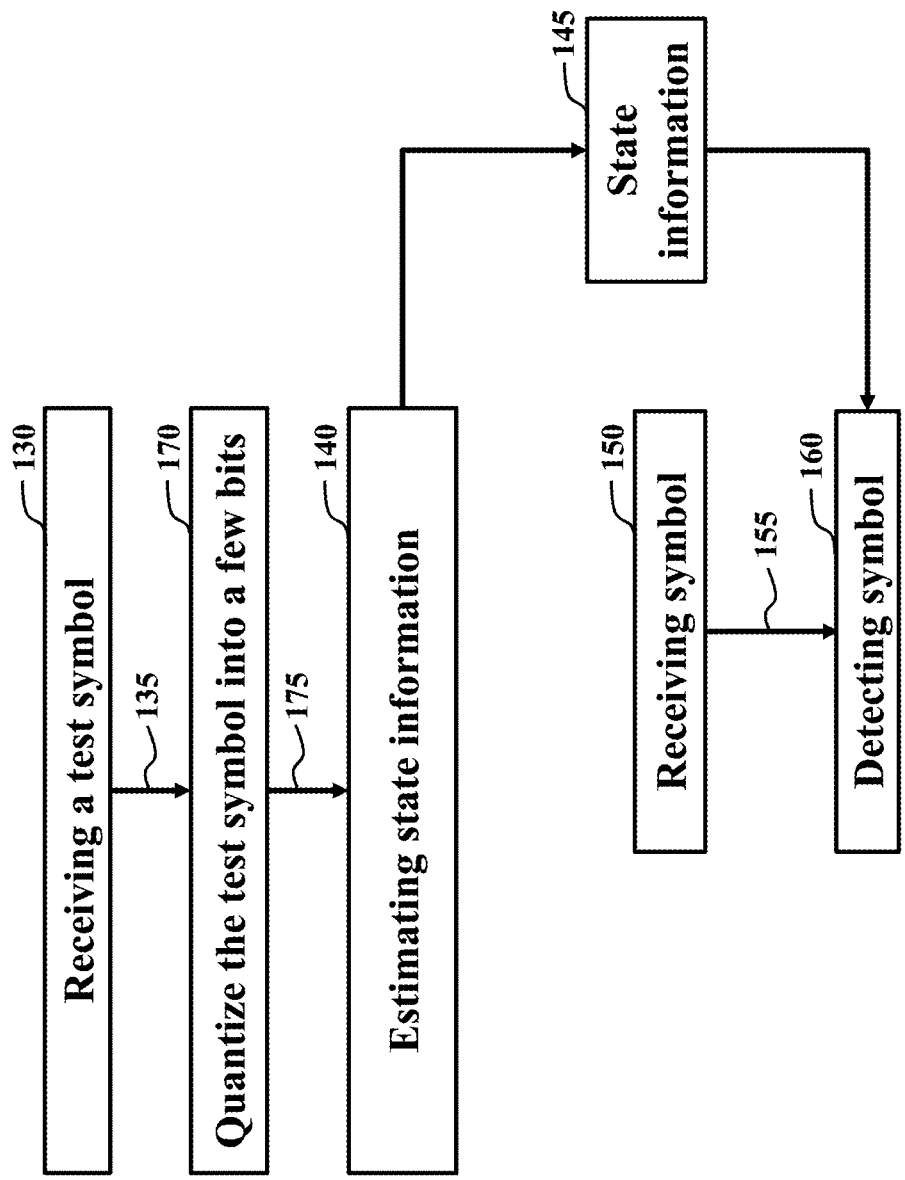
FIG. 1C shows a block diagram of some method steps for decoding a symbol transmitted over the wireless channel, according to some embodiments of the present disclosure.

FIG. 1C shows a block diagram of a method for decoding a symbol transmitted over the wireless channel according to one embodiment of the present disclosure. The method receives 130 a test symbol 135 transmitted over the wireless channel, quantizes 170 the test symbol into a few bits or just 1 bit in the extreme case, and estimates 140 state information 145 of the wireless channel on the quantized test symbol 175. The value of the test symbol is known and the estimation is performed according to an angular-domain model of the wireless channel that includes statistics on paths, gain and spread of the wireless propagation channel. When the method receives 150 a symbol 155, e.g., a data symbol, the method detects 160 the symbol 155 using the state information 145 of the wireless channel. The steps of the method can be performed by a processor of a receiver.

Figure 1D:
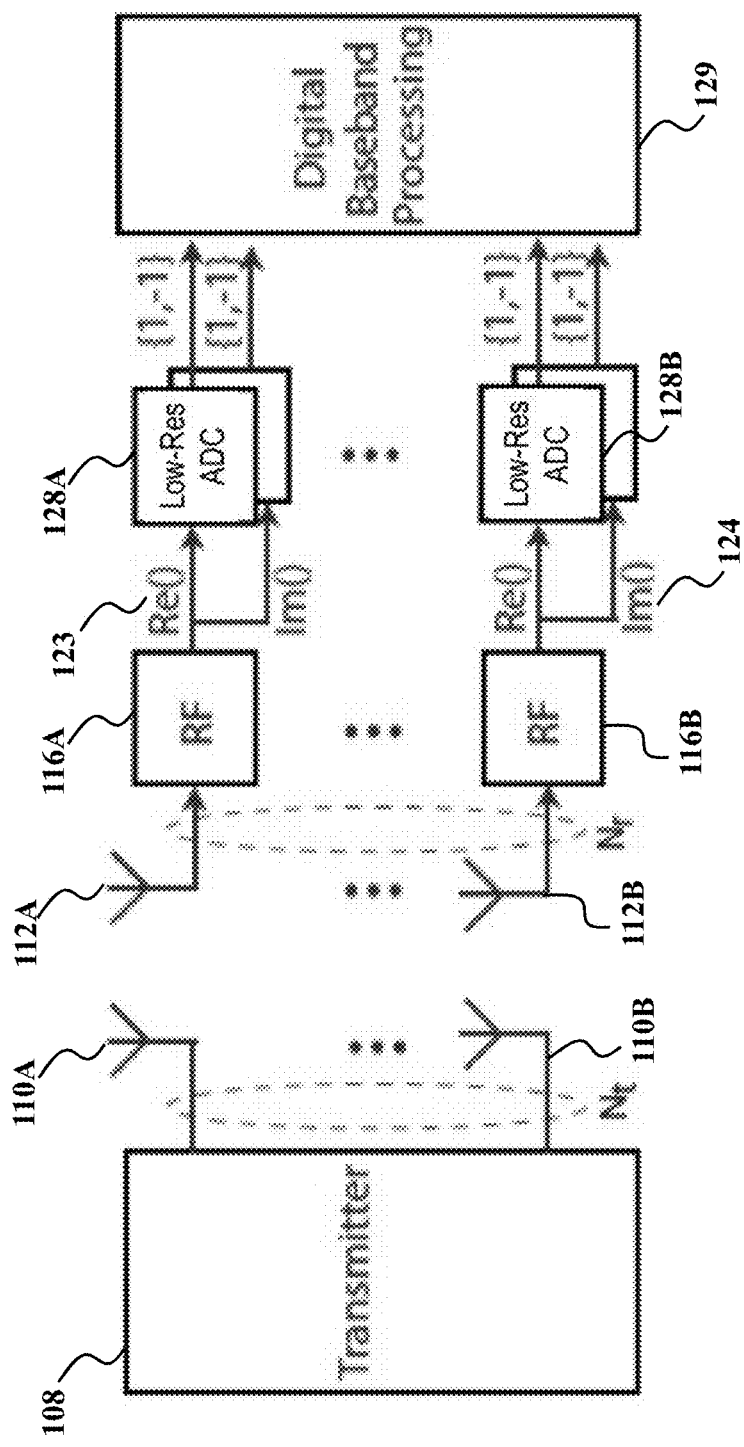
FIG. 1D shows a schematic of some components of a wireless MIMO system of FIG. 1B, according to some embodiments of the present disclosure.

FIG. 1D shows a schematic of the wireless MIMO system of FIG. 1B according to some embodiments of the present disclosure; Step 110A and Step 110B send the sequence of bits into the wireless channel Step 112A and Step 112B receive the propagated wireless signals from the receiving antenna array. Step 116A and Step 116B include the RF components such as low-noise amplifiers which pre-process the received analogy waveforms. Step 123 and Step 124 of FIG. 1D form the I/Q channels of the received signal by using the Hilbert transform. Step 128A and Step 128B quantize the analog baseband signals of the I/Q channels using low-resolution ADCs. One low-resolution ADC is used for one receiving antenna or one RF chain. Step 129 includes all the baseband signal processing on the quantized I/Q signals.

Figure 2A:
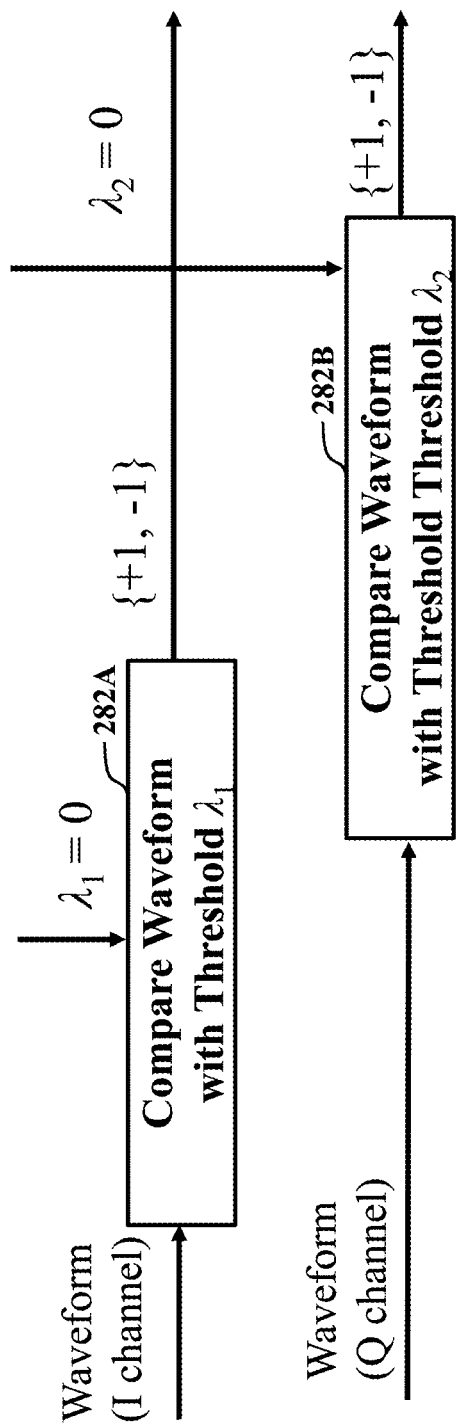
FIG. 2A shows a schematic of the quantization of the in-phase (I) and quadrature (Q) baseband signals with a fixed threshold at zero, including an I channel waveform compared with Threshold $\lambda_1$), and a Q channel waveform compared with Threshold $\lambda_2$, according to some embodiments of the present disclosure.

FIG. 2A shows a schematic of the quantization of the I/Q baseband signals with a fixed threshold at zero, including an I-channel waveform compared with Threshold $\lambda_1$), and a Q-channel waveform compared with Threshold $\lambda_2$, according to some embodiments of the present disclosure.

Step 282A compares the input waveform of the I channel with the fixed threshold at 0 to output 1 bit: +1 if the input waveform is positive or −1 if the input waveform is negative.

Step 282B compares the input waveform of the Q channel with the fixed threshold at 0 to output 1 bit: +1 if the input waveform is positive or −1 if the input waveform is negative.

FIG. 2B to FIG. 2I show graphs illustrating an example of the I/Q channel quantization with a fixed threshold at zero. From these figures, it is shown that the fixed threshold quantization at 0 produces the same quantized bits for two signals with the amplitude of one signal is twice larger than the amplitude of the other signal. In other words, the fixed threshold quantization at 0 can indicate only a sign of the measurement, i.e., whether the measurements is positive or negative, but fails to report on the magnitude of the measurements.

Figure 2B:
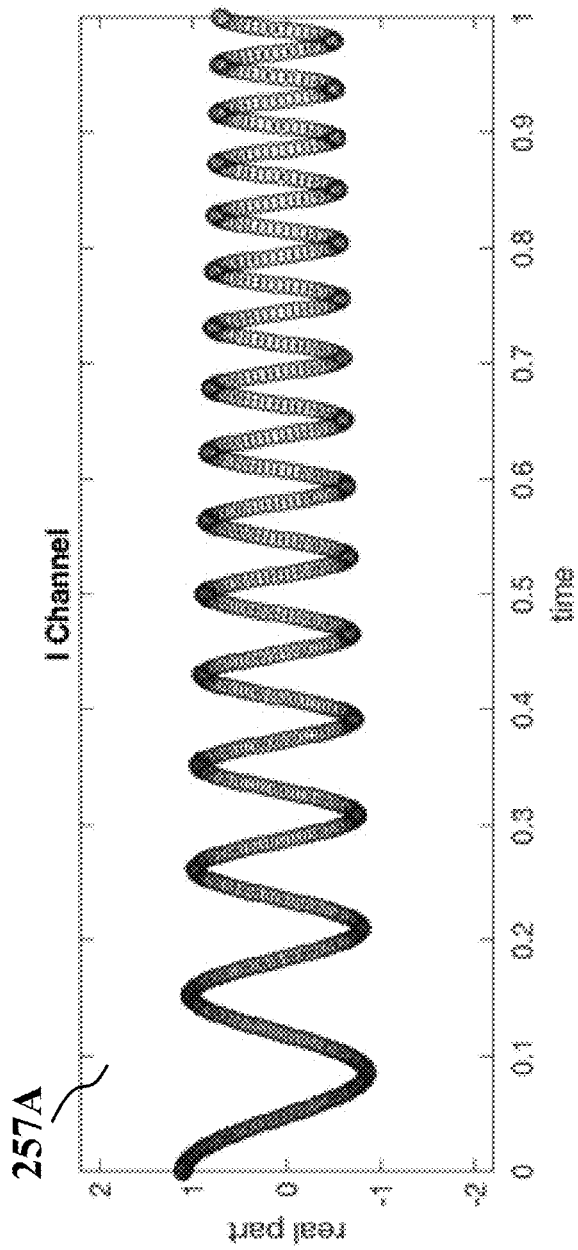
FIG. 2B and FIG. 2C show graphs illustrating an example of the I-channel quantization with a fixed threshold at zero.
Figure 2C:
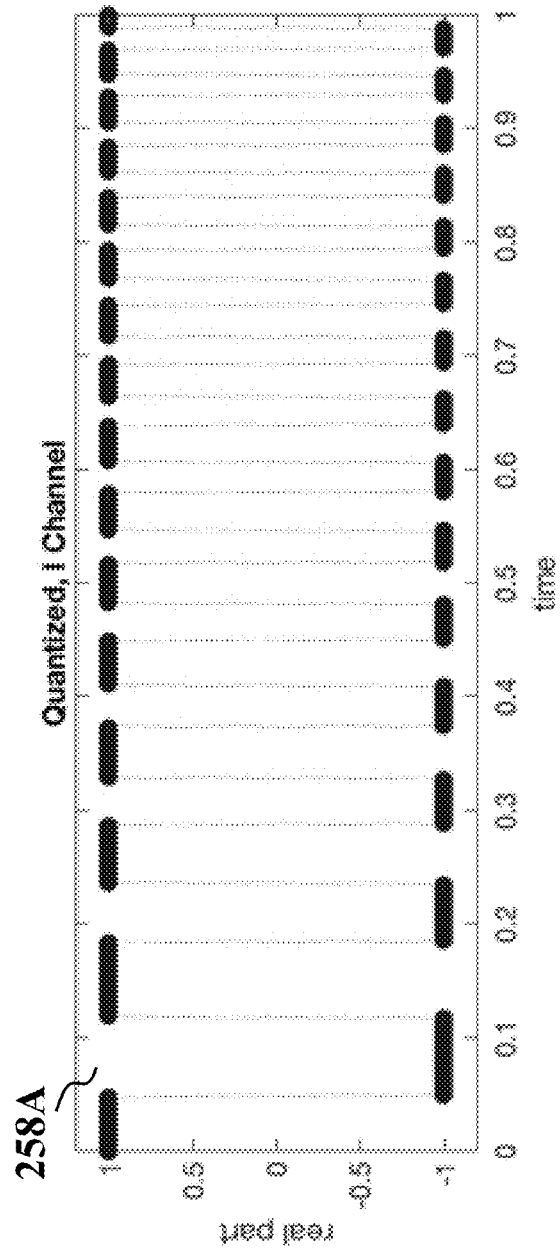

FIG. 2B and FIG. 2C show graphs illustrating an example of the I channel quantization with a fixed threshold at zero, FIG. 2B shows an example of the analog I-channel baseband waveform of FIG. 2A, FIG. 2C is comparing the analog I-channel baseband waveform with Threshold $\lambda_1$ of FIG. 2A, according to some embodiments of the present disclosure;

FIG. 2B shows an analogy I-channel baseband signal of 257A with the x-axis denoting the time and the y-axis denoting the signal amplitude. FIG. 2C shows the quantized bits of 258A by comparing the analogy signal of 257A with zeros.

FIG. 2D and FIG. 2E show graphs illustrating an example of the Q-channel quantization with a fixed threshold at zero, FIG. 2D shows an example of the analog Q-channel baseband waveform of FIG. 2A, and FIG. 2E is comparing the analog Q-channel baseband waveform with Threshold $\lambda_2$ of FIG. 2A, wherein the outputs are +1 if the signal is larger than zero (FIG. 2A), and −1 if the signal is less than zero (FIG. 2A), according to some embodiments of the present disclosure;

FIG. 2D shows an analogy Q-channel baseband signal of 257B with the x-axis denoting the time and the y-axis denoting the signal amplitude. FIG. 2E shows the quantized bits of 258B by comparing the analogy signal of 257B with zeros.

FIG. 2F and FIG. 2G, FIG. 2F shows a graph illustrating the same analog I-channel baseband signal of FIG. 2B, except the amplitude is multiplied by 2. FIG. 2G shows the quantized I-channel baseband signal by comparing the FIG. 2F graph with the zero, according to some embodiments of the present disclosure;

FIG. 2F shows an analogy I-channel baseband signal of 267A which is the same with respect to the signal 257A in FIG. 2B except the amplitude is multiplied by 2. FIG. 2G shows the quantized bits of 268A by comparing the analogy signal of 267A with zeros. The quantized bits in 268A are the exactly same as the quantized bits in 258A in FIG. 2C, although the input waveforms are different in amplitudes.

Figure 2H:
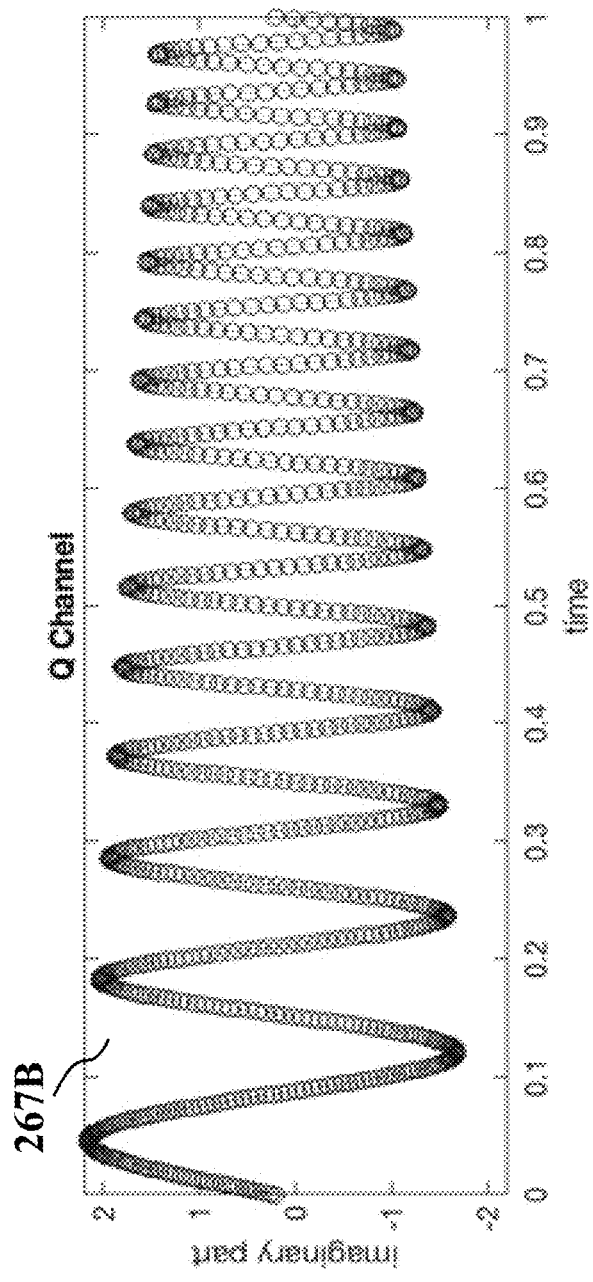
FIG. 2H and FIG. 2I, FIG. 2I shows a graph illustrating the same analog Q-channel baseband signal of FIG. 2D, except the amplitude is multiplied by 2.
Figure 2I:
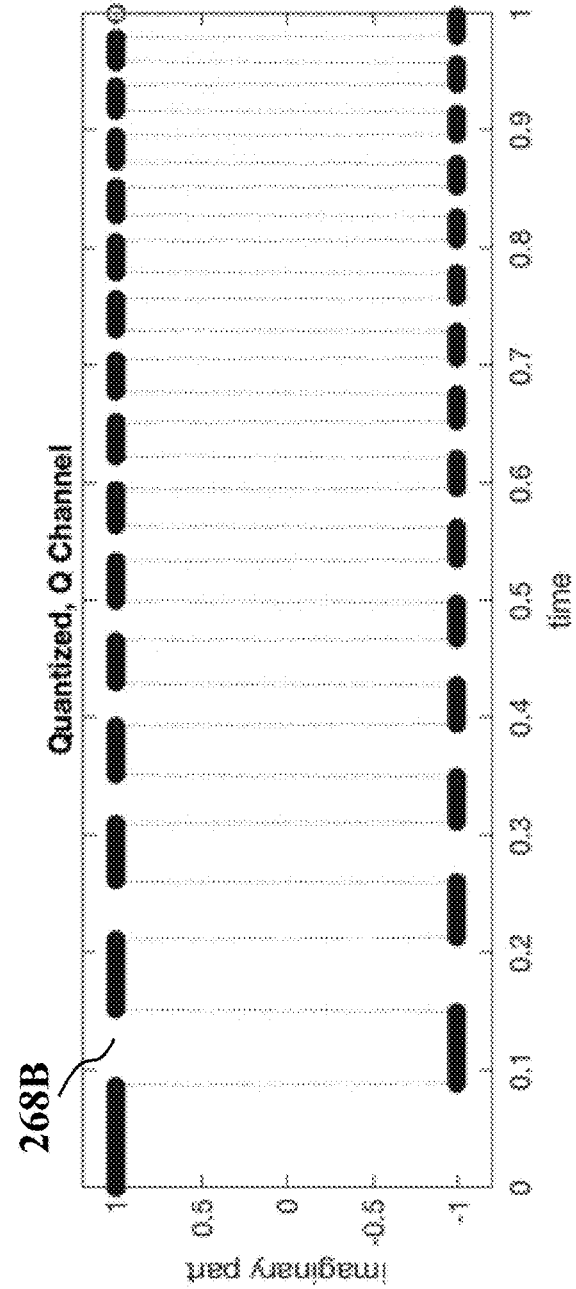

FIG. 2H and FIG. 2I, FIG. 2H shows a graph illustrating the same analog Q-channel baseband signal of FIG. 2D, except the amplitude is multiplied by 2. FIG. 2I shows the quantized Q-channel baseband signal by comparing the FIG. 2H graph with the zero, according to some embodiments of the present disclosure;

FIG. 2H shows an analogy Q-channel baseband signal of 267B which is the same with respect to the signal 257B in FIG. 2D except the amplitude is multiplied by 2. FIG. 2I shows the quantized bits of 268B by comparing the analogy signal of 267B with zeros. The quantized bits in 268B are the exactly same as the quantized bits in 258B in FIG. 2E, although the input waveforms are different in amplitudes.

It is seen that graphs 268A of FIGS. 2G and 268B of FIG. 2I is the same as graphs 258A of FIGS. 2C and 258B of FIG. 2E, because the multiplication of 2 does not change the positive or negative sets of the signal.

Figure 3A:
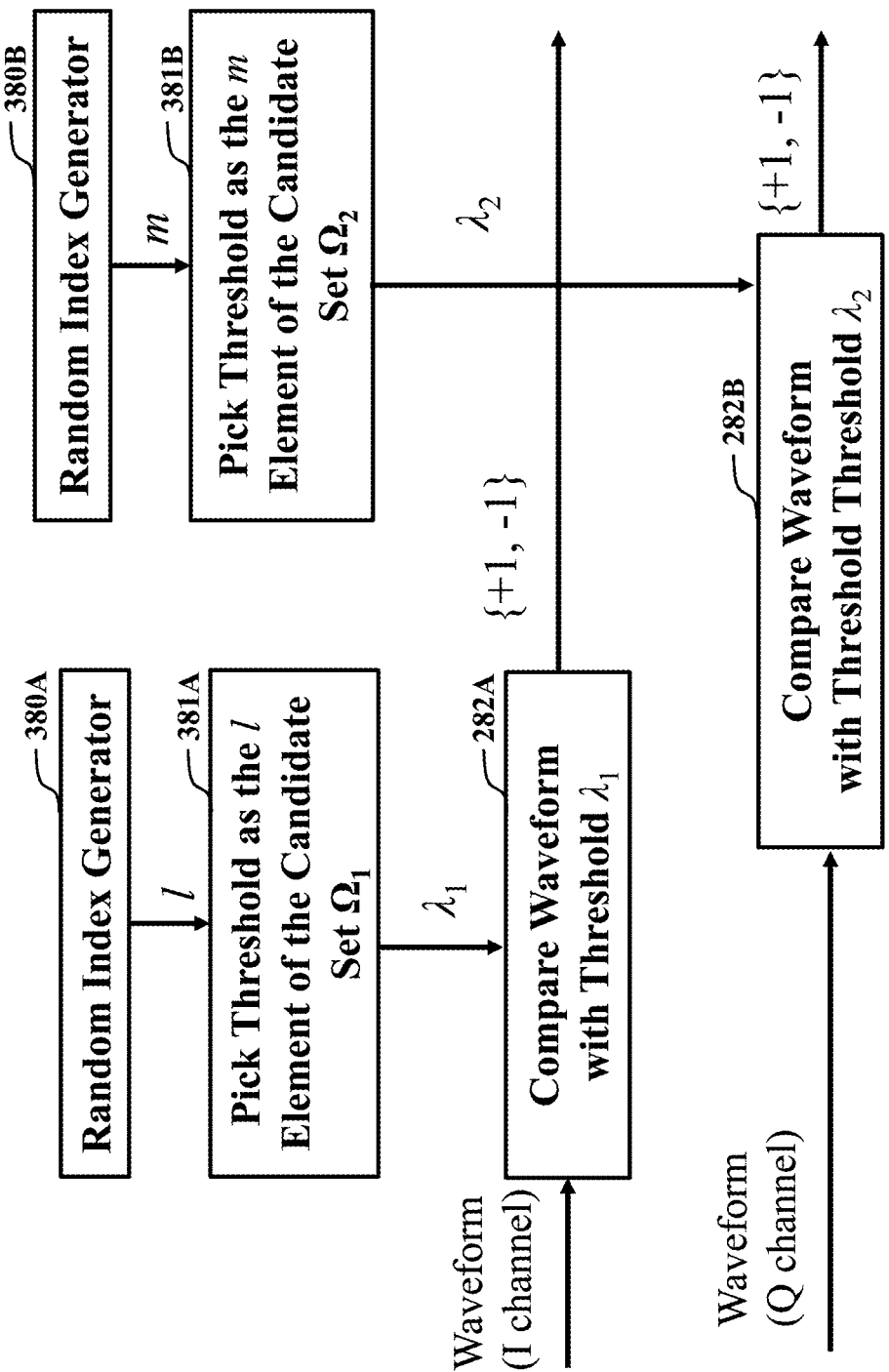
FIG. 3A shows a schematic of the quantization of the analog I/Q-channel baseband signals with a randomly selected threshold from a candidate set, including an I-channel waveform compared with Threshold $\lambda_1$), and a Q-channel waveform compared with Threshold $\lambda_2$), according to some embodiments of the present disclosure.

FIG. 3A shows a schematic of the quantization of the analog I/Q-channel baseband signals with a randomly selected threshold from a candidate set, including an I-channel waveform compared with Threshold $\lambda_1$), and a Q-channel waveform compared with Threshold $\lambda_2$), according to some embodiments of the present disclosure;

Step 380A randomly generates an integer/which is between 1 and the length of a threshold candidate set $\Omega$. Step 381A determines the threshold by indexing the l-th element of the candidate set $\Omega$. Step 382A compares the input waveform for the I channel with the selected threshold to output 1 bit, i.e., +1 or −1, i.e., comparing the I channel waveform with Threshold $\lambda_1$.

Step 380B randomly generates an integer m which is between 1 and the length of a threshold candidate set $\Omega2$. Step 381B determines the threshold by indexing the m-th element of the candidate set $\Omega_2$. Step 382B compares the input waveform for the Q channel with the selected threshold to output 1 bit, i.e., +1 or −1, i.e., comparing the Q channel waveform with Threshold $\lambda_2$.

Figure 3B:
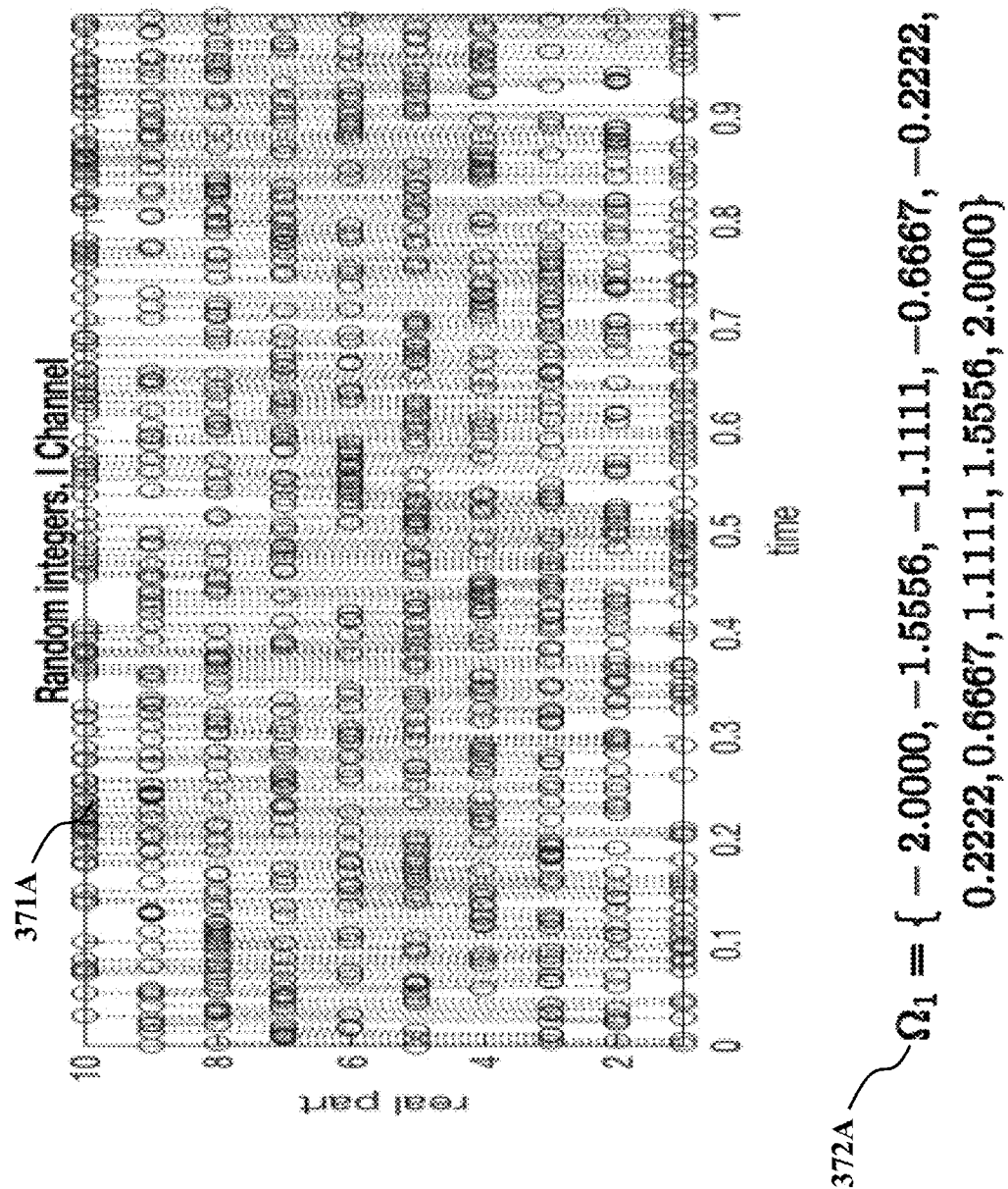
FIG. 3B is a graph illustrating an example of the I-channel quantization with the time-varying thresholds, showing the randomly generated integers 371A for all sampling time instances for the I channel, including a candidate set 372A of randomly selected thresholds for the I channel, according to some embodiments of the present disclosure.

FIG. 3B is a graph illustrating an example of the I channel quantization with the time-varying thresholds, showing the randomly generated integers for all sampling time instances for the I channel, including a candidate set of randomly selected thresholds for the I channel, according to some embodiments of the present disclosure.

Specifically, FIG. 3B shows an example of the I channel quantization with the time-varying thresholds 371A, in particular, showing the randomly generated integers for all sampling time instances for the I channels. In this example, the size of the threshold candidate set is 10, 372A. As a result, the random integers are in between 1 and 10.

Figure 3C:
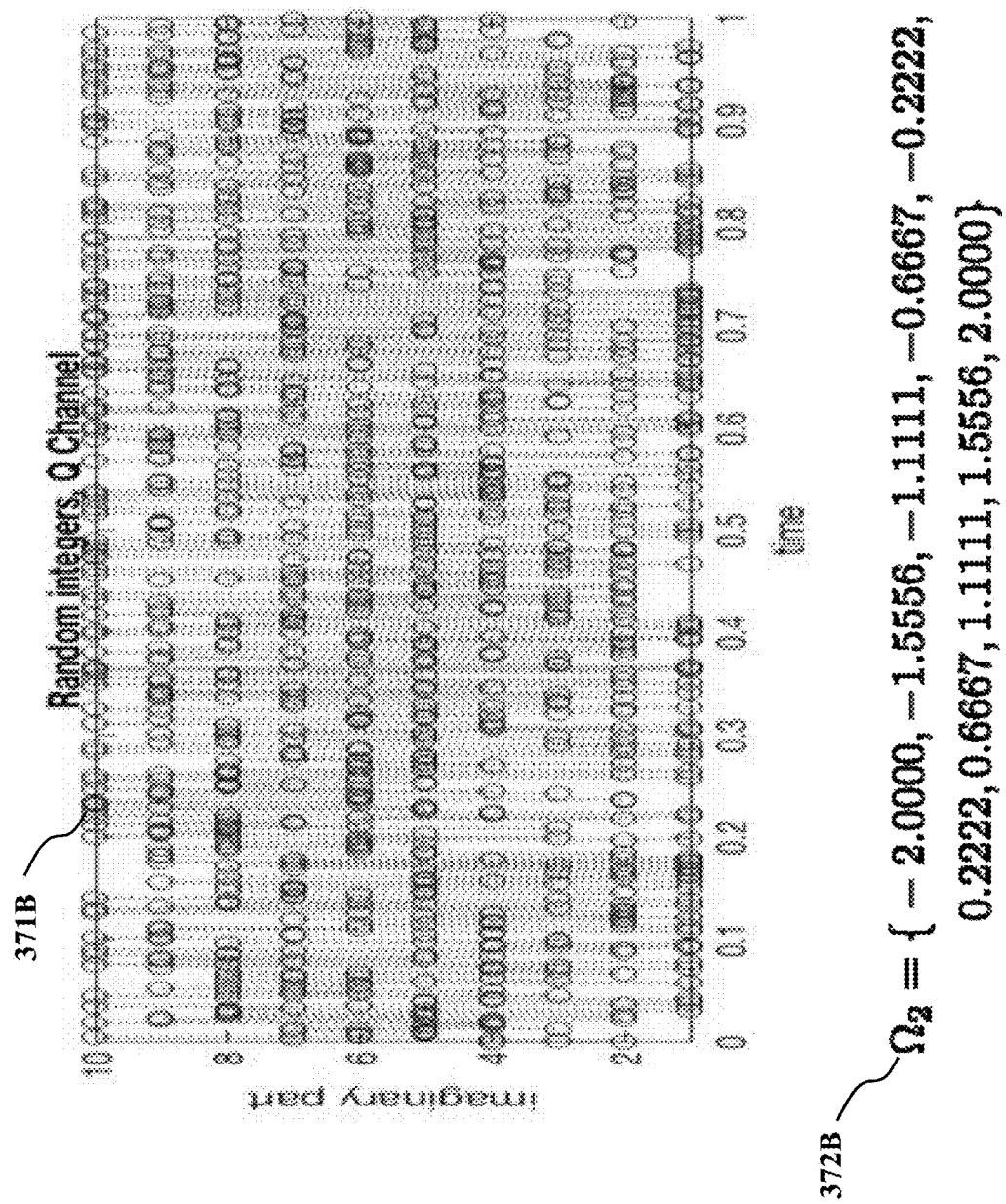
FIG. 3C is a graph illustrating an example of the Q-channel quantization with the time-varying thresholds, showing the randomly generated integers 371B for all sampling time instances for the Q channel, including a candidate set 372B of randomly selected thresholds for the Q channel, according to some embodiments of the present disclosure.

FIG. 3C is a graph illustrating an example of the Q channel quantization with the time-varying thresholds 371B, showing the randomly generated integers for all sampling time instances for the Q channel, including a candidate set of randomly selected thresholds for the Q channel, according to some embodiments of the present disclosure.

Specifically, FIG. 3C shows an example of the Q channel quantization with the time-varying thresholds 371B, in particular, showing the randomly generated integers for all sampling time instances for the Q channels. In this example, the size of the threshold candidate set is 10, 372B. As a result, the random integers are in between 1 and 10.

Regarding FIG. 3B and FIG. 3C, the graphs show that two threshold candidate sets for the I channel (372A) and the Q channel (372B), in this specific example, the two sets are the same with 10 numbers between −2 and 2.

Figure 3D:
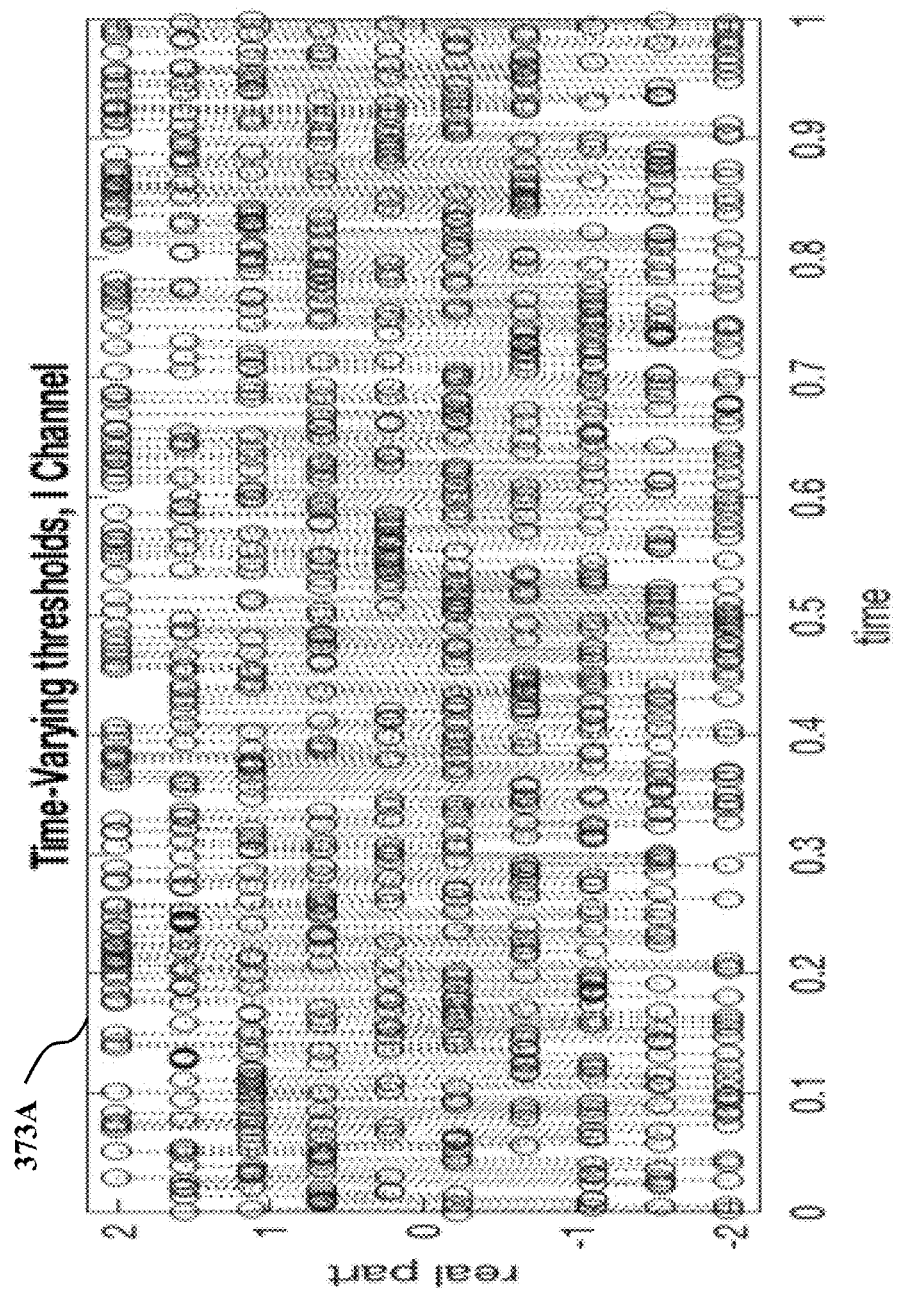
FIG. 3D is a graph illustrating the selected time-varying thresholds for the I channel by indexing the randomly generated integers 371A from FIG. 3B, in the threshold set of 372A of FIG. 3B, according to some embodiments of the present disclosure.

FIG. 3D is a graph illustrating the selected time-varying thresholds for the I channel by indexing the randomly generated integers from FIG. 3B, in the threshold set of 372A of FIG. 3B, according to some embodiments of the present disclosure.

Figure 3E:
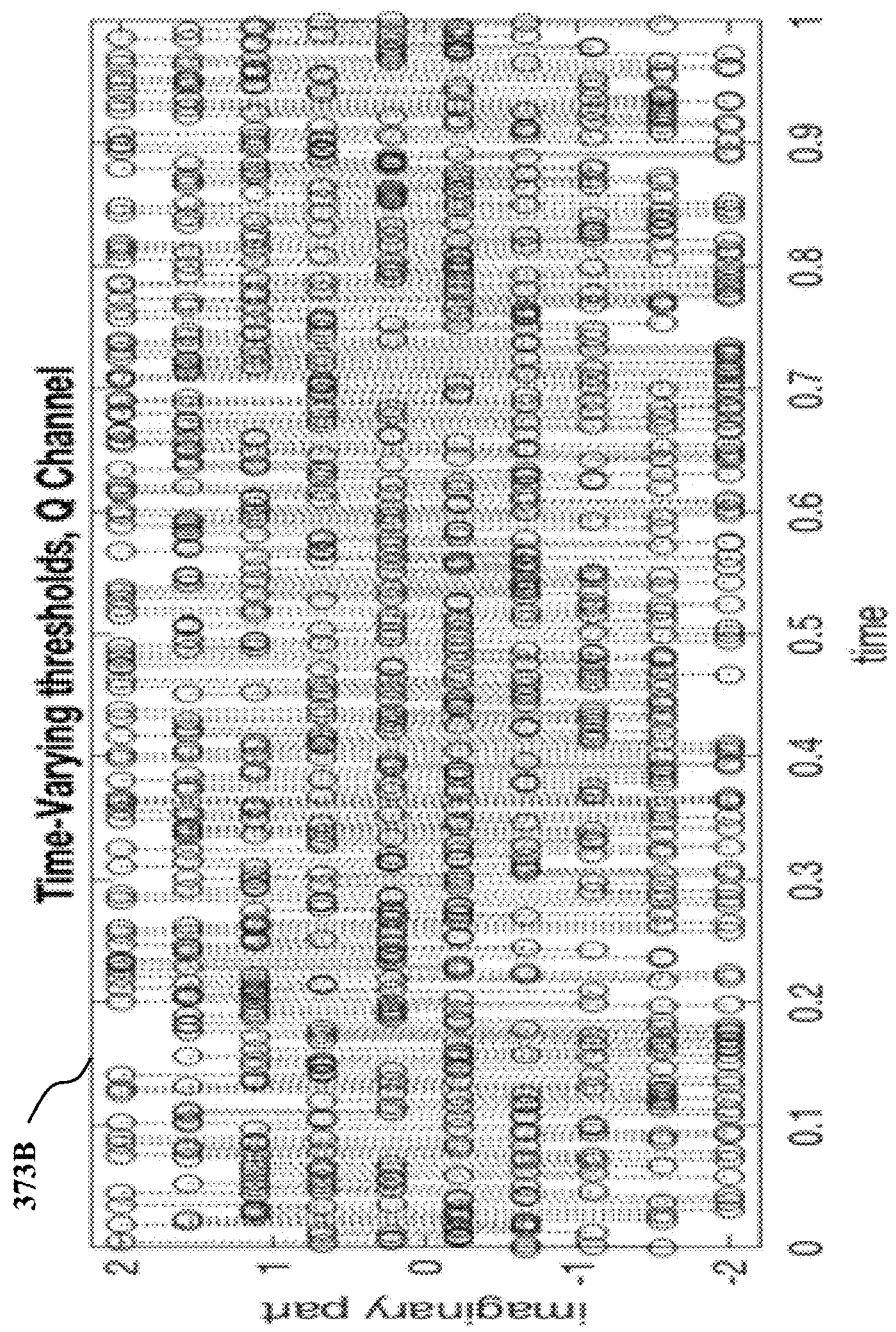
FIG. 3E is a graph illustrating the selected time-varying thresholds for the Q channel by indexing the randomly generated integers 371B from FIG. 3C, in the threshold set of 372B of FIG. 3C, according to some embodiments of the present disclosure.

FIG. 3E is a graph illustrating the selected time-varying thresholds for the Q channel by indexing the randomly generated integers from FIG. 3C, in the threshold set of 372B of FIG. 3C, according to some embodiments of the present disclosure.

Regarding FIG. 3D and FIG. 3E, the graphs show that the selected thresholds are different between the I channel (FIG. 3D) and Q channel FIG. 3E).

Figure 3F:
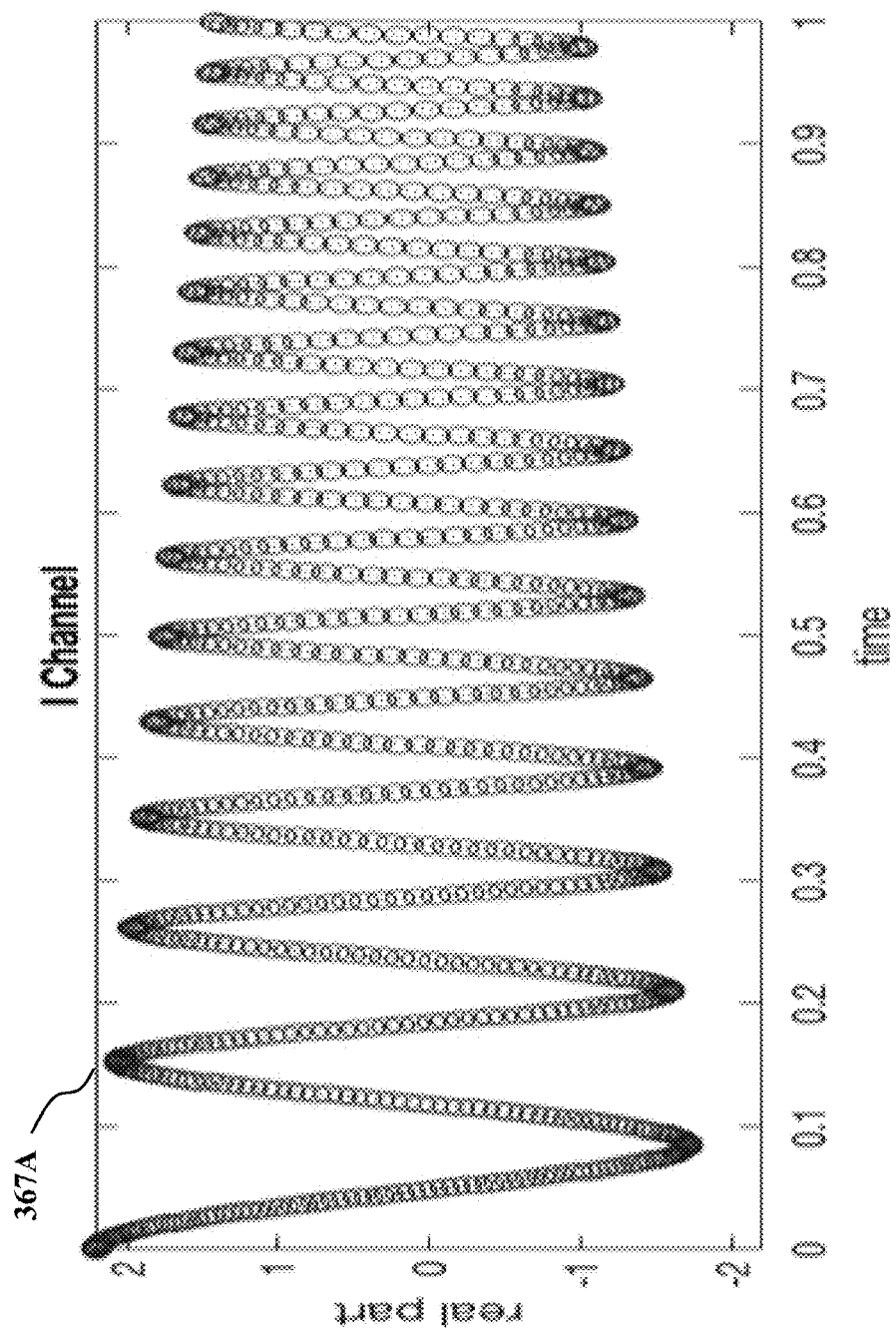
FIG. 3F is a graph illustrating the same analog I-channel baseband signal of graph 267A of FIG. 2F, according to some embodiments of the present disclosure.

FIG. 3F is a graph illustrating the same I signal of graph 267A of FIG. 2F, according to some embodiments of the present disclosure.

Figure 3G:
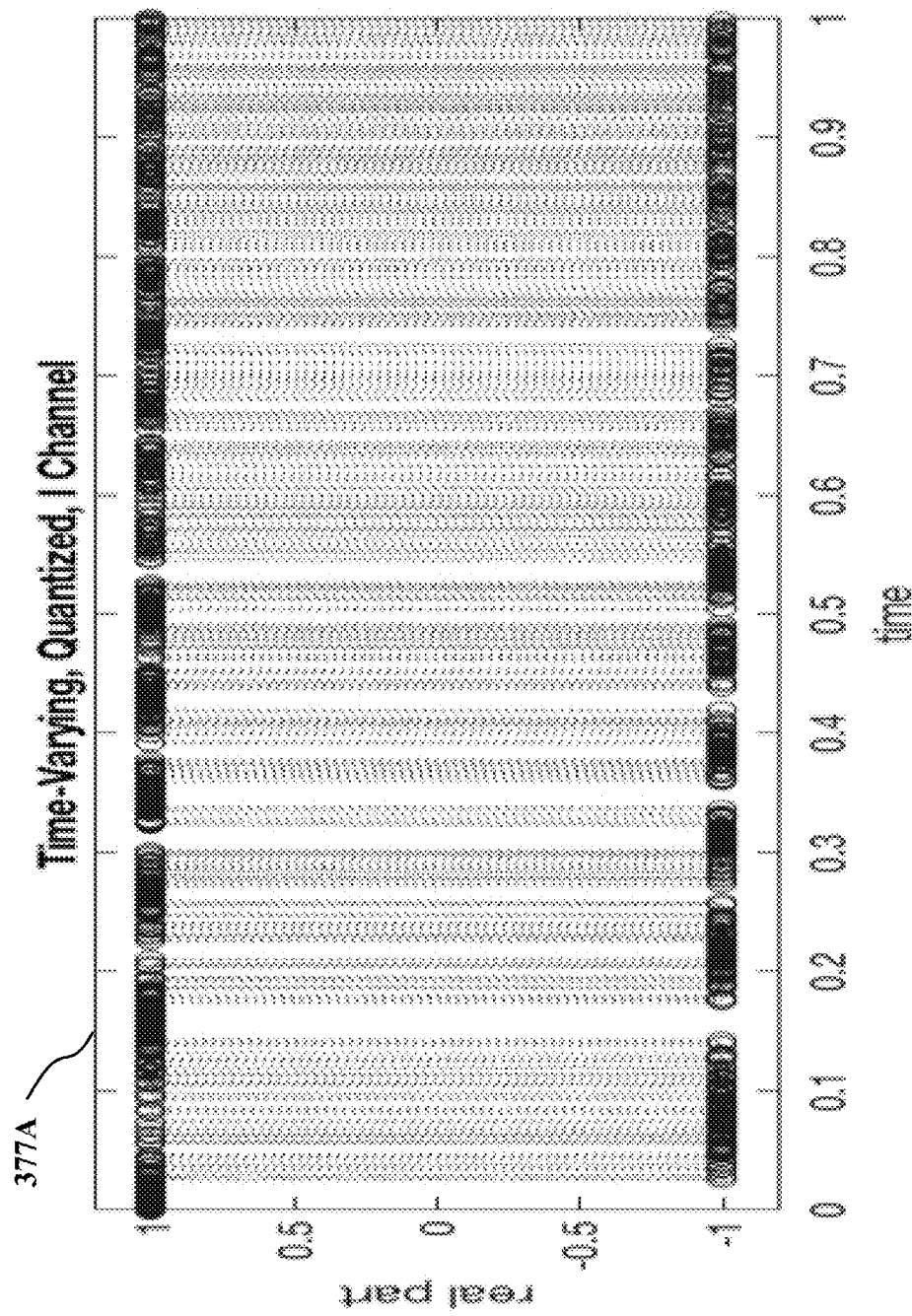
FIG. 3G is a graph illustrating the quantized I-channel basesband signal 377A by comparing graph 367A with the selected random thresholds of 373A in FIG. 3D, according to some embodiments of the present disclosure.

FIG. 3G is a graph illustrating the same quantized I signal of graph 268A of FIG. 2G, according to some embodiments of the present disclosure.

Figure 3H:
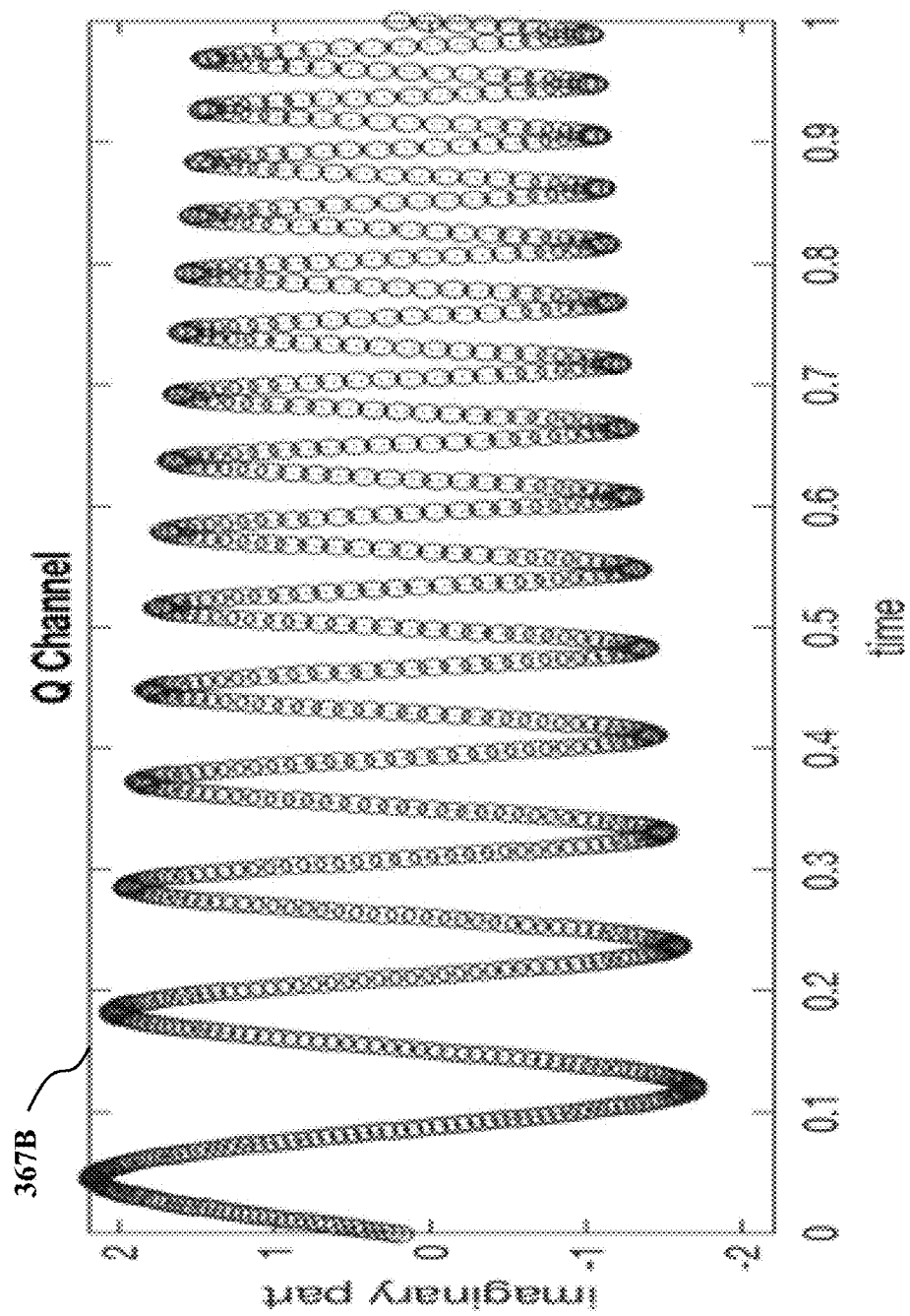
FIG. 3H is a graph illustrating the same analog Q-channel baseband signal of graph 267B of FIG. 2H, according to some embodiments of the present disclosure.

FIG. 3H is a graph illustrating the same Q signal of graph 267B of FIG. 2H, according to some embodiments of the present disclosure.

Figure 3I:
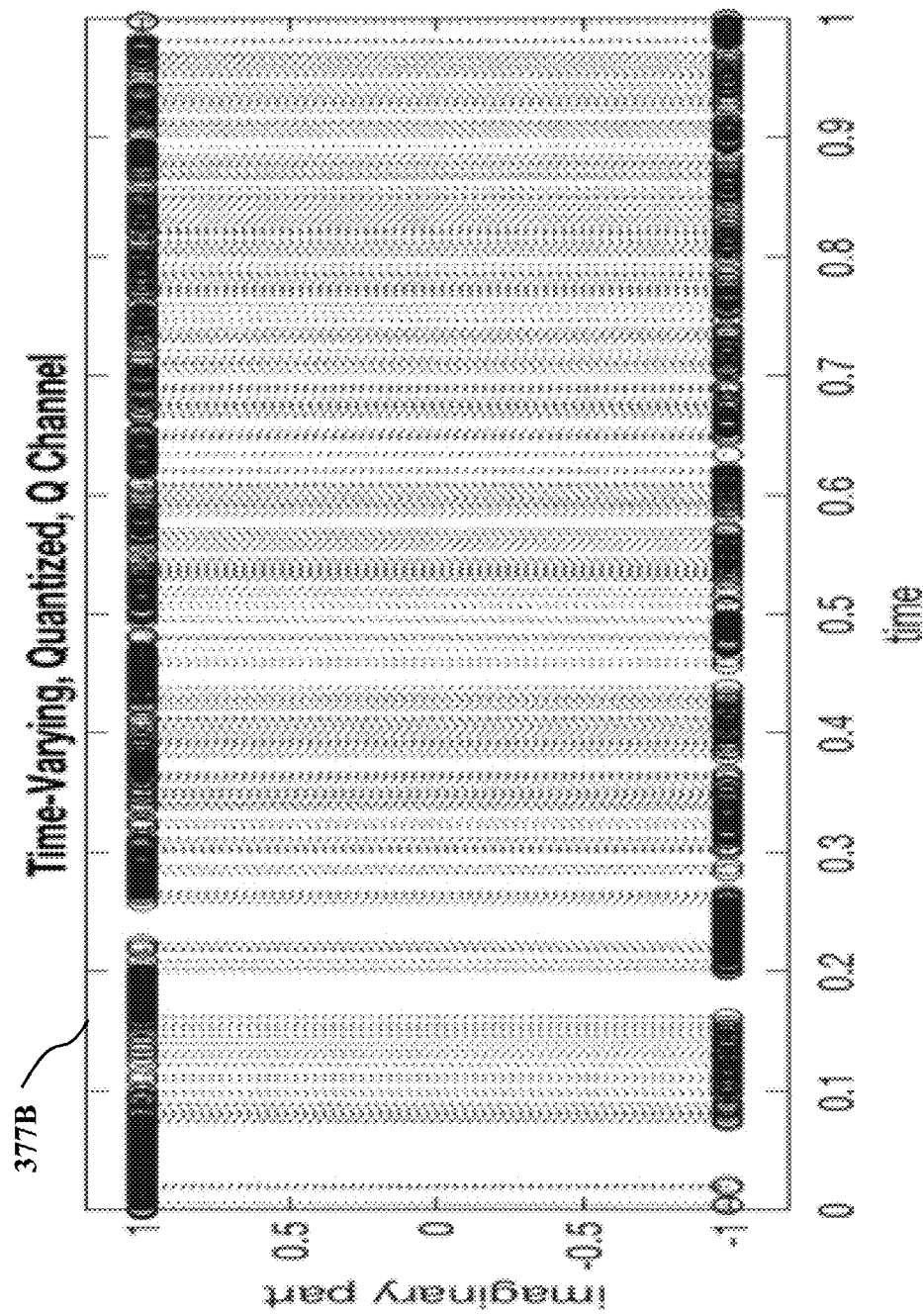
FIG. 3I is a graph illustrating the quantized Q-channel basesband signal 377B by comparing graph 367B with the selected random thresholds of 373B in FIG. 3E, according to some embodiments of the present disclosure.

FIG. 3I is a graph illustrating the same quantized Q signal of graph 268B of FIG. 2I, according to some embodiments of the present disclosure.

Figure 4A:
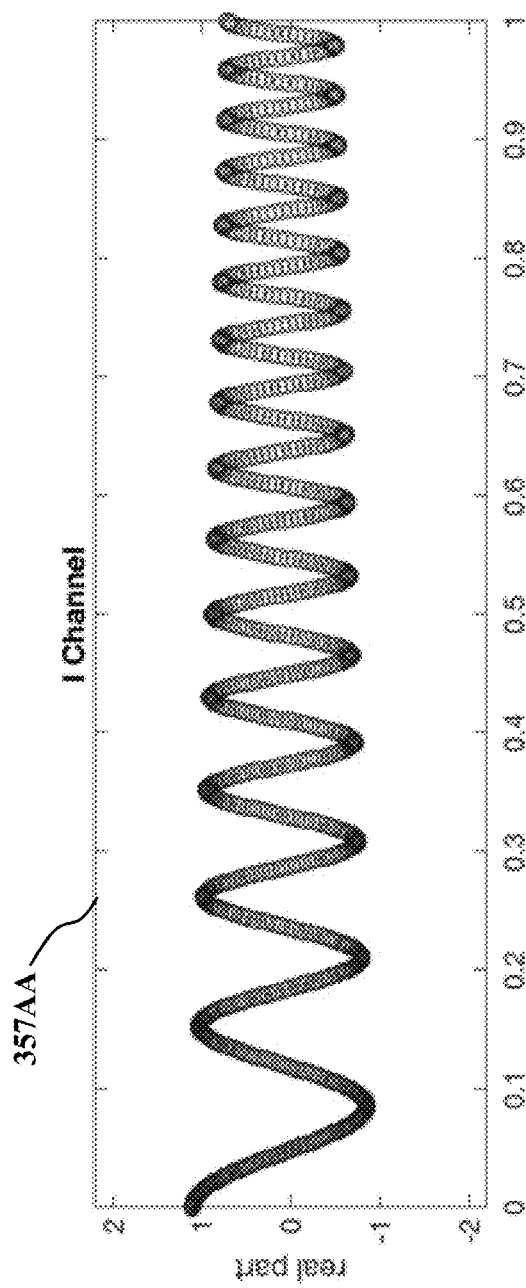
FIG. 4A is a graph illustrating the same analog I-channel baseband signal of graph 257A of FIG. 2B, according to some embodiments of the present disclosure.

FIG. 4A is a graph illustrating the same I signal of graph 257A of FIG. 2B, but with the time-varying thresholds, according to some embodiments of the present disclosure.

Figure 4B:
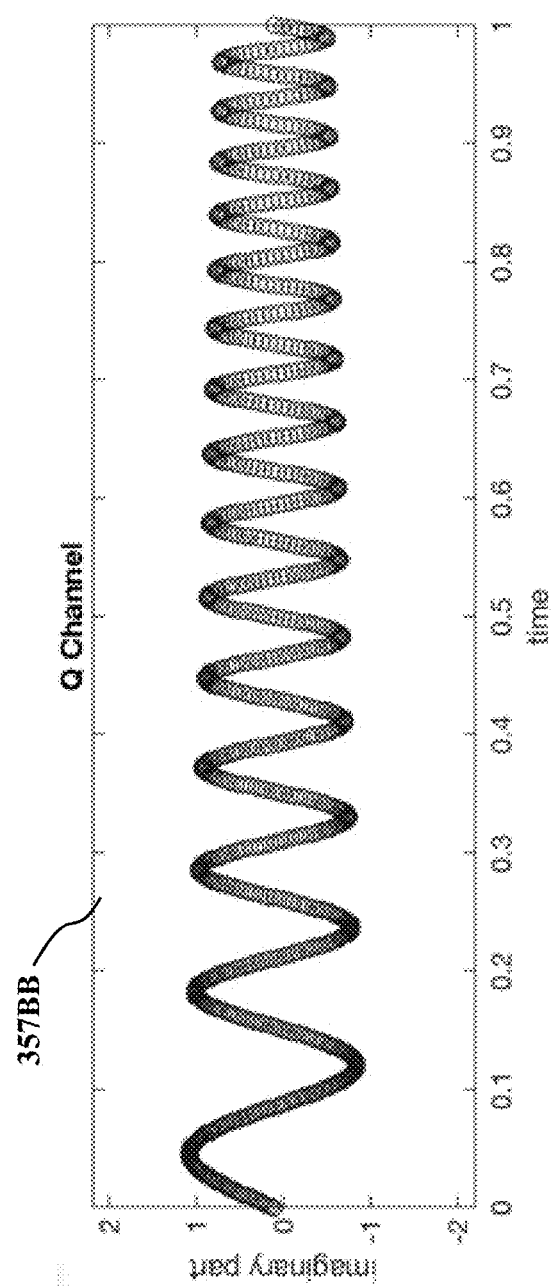
FIG. 4B is a graph illustrating the same analog Q-channel baseband signal of graph 257B of FIG. 2D, according to some embodiments of the present disclosure.

FIG. 4B is a graph illustrating the same Q signal of graph 257B of FIG. 2D, but with the time-varying thresholds, according to some embodiments of the present disclosure.

FIG. 4C is a graph illustrating the quantized I signal by comparing the signal of graph 357AA of FIG. 4A, with the thresholds in graph 373A of FIG. 3D, according to some embodiments of the present disclosure.

FIG. 4D is a graph illustrating the quantized Q signal by comparing the signal of graph 357BB of FIG. 4D, with the thresholds in graph 373B of FIG. 3E, according to some embodiments of the present disclosure.

FIG. 4E is a graph illustrating the same I signal of graph 267A of FIG. 2F, but with the time-varying thresholds, according to some embodiments of the present disclosure.

FIG. 4F is a graph illustrating the same Q signal of graph 267B of FIG. 2H, but with the time-varying thresholds, according to some embodiments of the present disclosure.

FIG. 4G is a graph illustrating the quantized I signal by comparing the signal of graph 367AA of FIG. 4E, with the thresholds in graph 373A of FIG. 3D, according to some embodiments of the present disclosure.

FIG. 4H is a graph illustrating the quantized Q signal by comparing the signal of graph 367BB of FIG. 4F, with the thresholds in graph 373B of FIG. 3E, according to some embodiments of the present disclosure.

It is seen that, in contrast to the quantized signals in FIG. 2F, FIG. 2E, FIG. 2G and FIG. 2I, which are the same, the quantized signals in FIG. 4C, FIG. 4D, FIG. 4G and FIG. 4H, are different due to the time-varying thresholds.

Figure 5A:
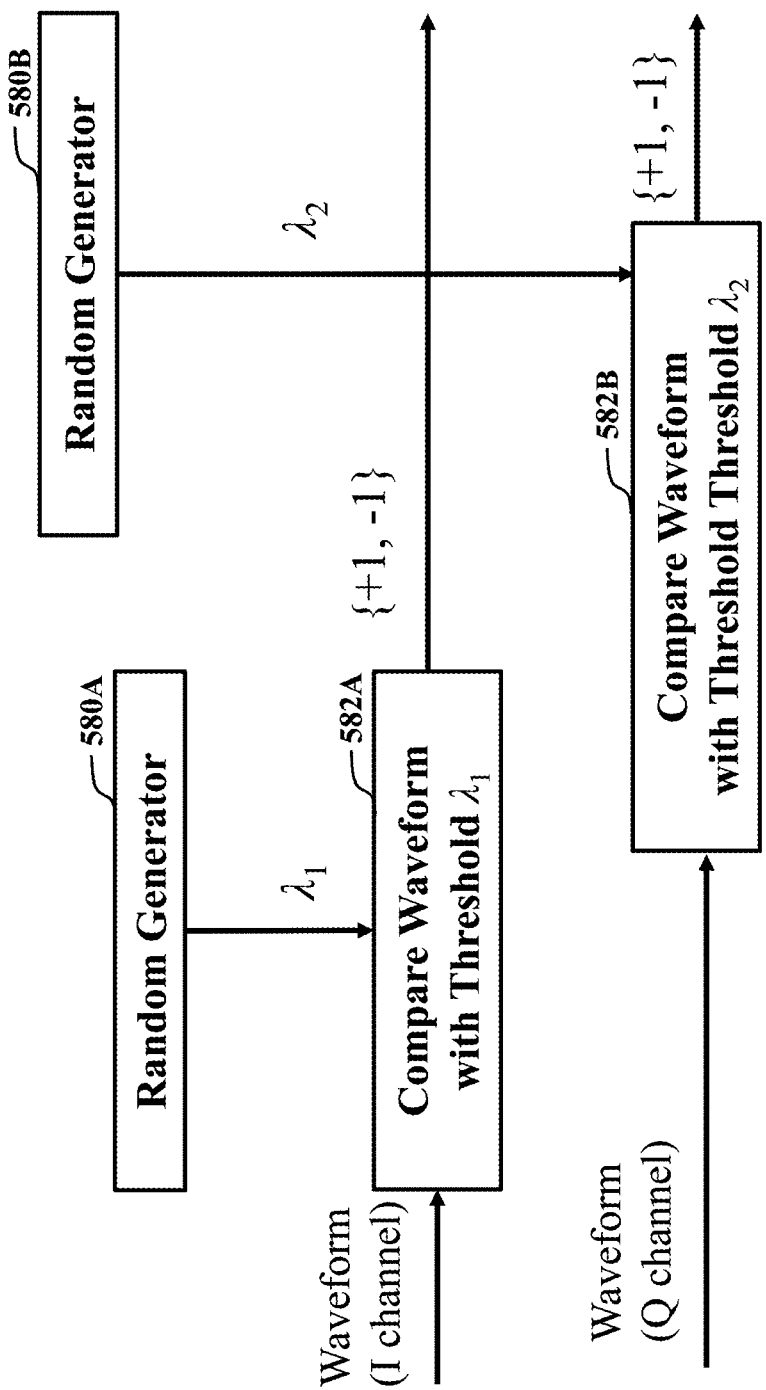
FIG. 5A shows a block diagram of some method steps for the quantization of the I/Q-channel baseband signals with a randomly selected threshold which is not chosen from a threshold candidate set, according to some embodiments of the present disclosure.

FIG. 5A shows a block diagram of some method steps for the quantization of the I/Q baseband signals with a randomly selected threshold which is not chosen from a threshold candidate set, according to some embodiments of the present disclosure.

Step 580A randomly generates a real number which may be limited in an interval due to physical constraints for the I channel waveform. Step 582A compares the input waveform for the I channel with the selected threshold to output 1 bit, i.e., +1 or −1.

Step 580B randomly generates a real number which may be limited in an interval due to physical constraints for the Q channel waveform. Step 582B compares the input waveform for the Q channel with the selected threshold to output 1 bit, i.e., +1 or −1.

Figure 5B:
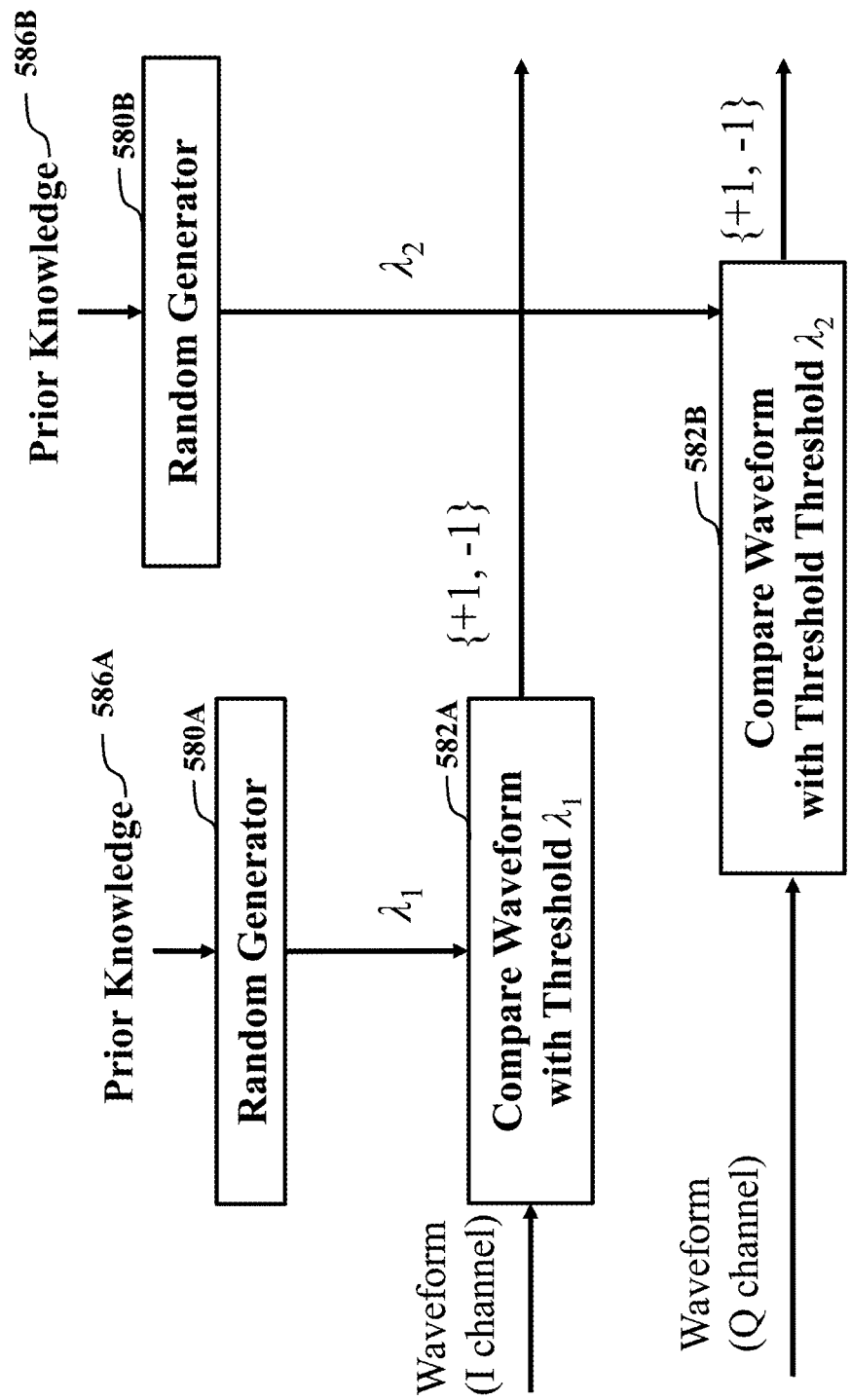
FIG. 5B shows a block diagram of some method steps for the quantization of the I/Q-channel baseband signals with a randomly selected threshold which uses some prior knowledge about the wireless channel, e.g., the long-term channel statistics, according to some embodiments of the present disclosure.

FIG. 5B shows a block diagram of some method steps for the quantization of the I/Q baseband signals with a randomly selected threshold which uses some prior knowledge about the wireless channel, e.g., the long-term channel statistics, according to some embodiments of the present disclosure.

Step 586A represents the prior knowledge from past measurement(s), geometry and other knowledge sources for the I channel waveform. Step 580A randomly generates a real number which may be limited in an interval due to physical constraints and utilizes the prior knowledge for the I channel waveform. Step 582A compares the input waveform for the I channel with the selected threshold to output 1 bit, i.e., +1 or −1.

Step 580B represents the prior knowledge from past measurement(s), geometry and other knowledge sources for the Q channel waveform. Step 580B randomly generates a real number which may be limited in an interval and utilizes the prior knowledge due to physical constraints for the Q channel waveform. Step 582B compares the input waveform for the Q channel with the selected threshold to output 1 bit, i.e., +1 or −1.

Figure 6:
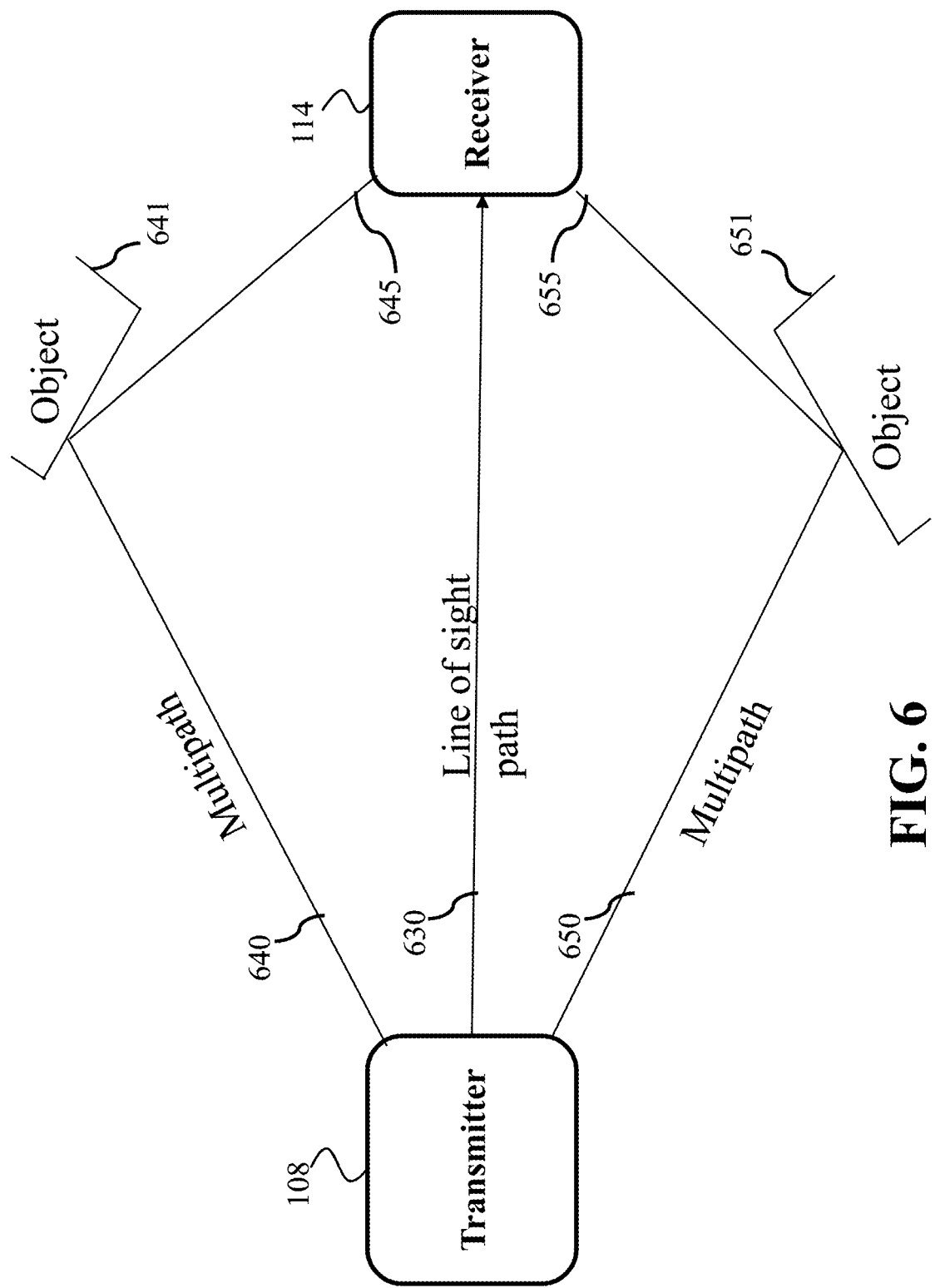
FIG. 6 shows a schematic illustrating principles of propagation in the wireless channel employed by various embodiments, according to some embodiments of the present disclosure.

FIG. 6 shows a schematic illustrating principles of propagation in the wireless channel employed by various embodiments, according to some embodiments of the present disclosure. For example, a signal sent from the transmitter 108 reaches the receiver 114 via channel paths 630, 640 and 650. The objects 641, 651 bounce off the wireless waves, the arrivals at the receiver via the reflected paths 645, 655. The channel paths can be sparse, i.e., a few paths if the millimeter wave is used for propagation. The channel paths can spread over the angle of departure from the transmitter and the angle of arrival to the receiver.

Figure 7:
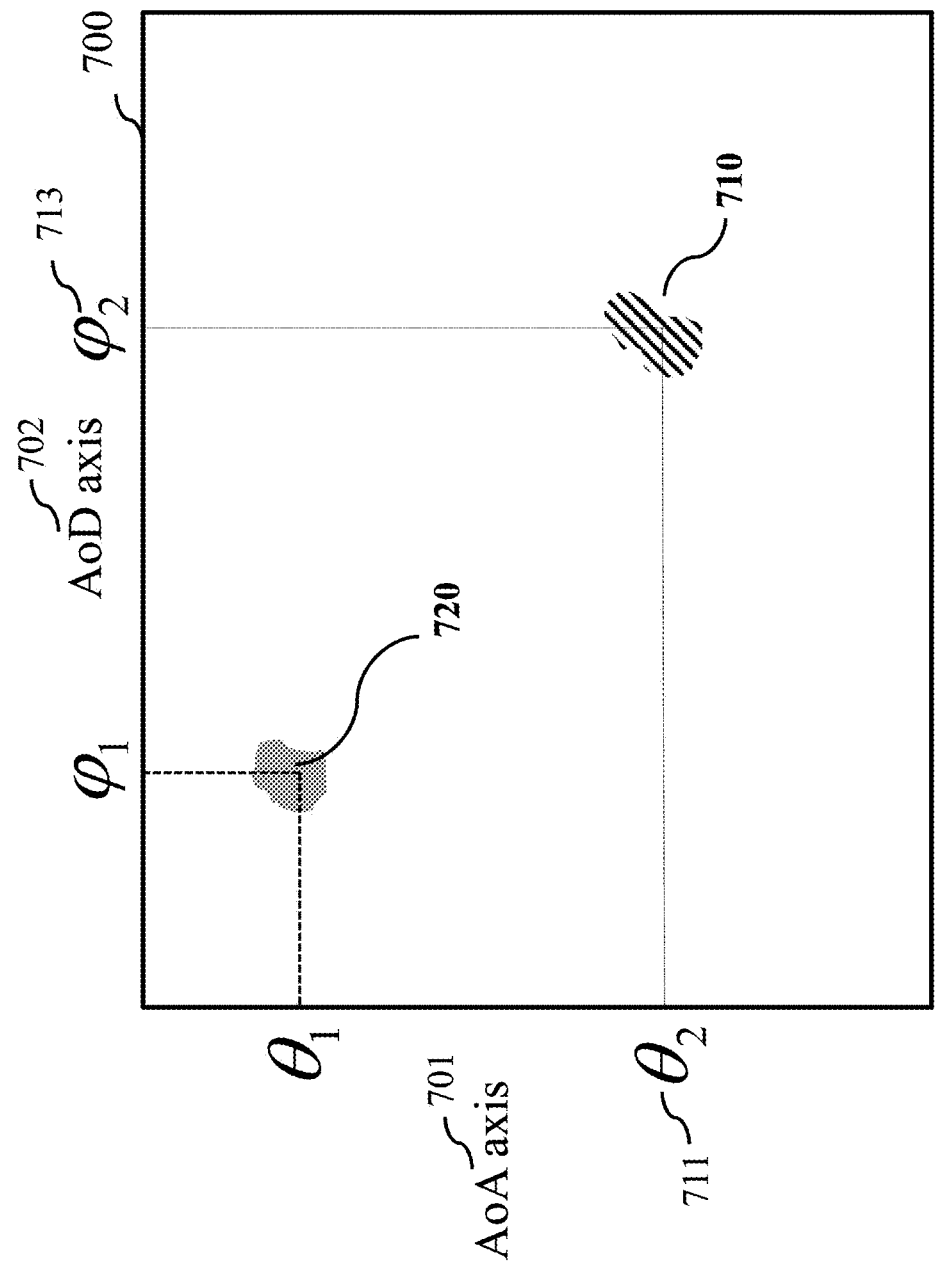
FIG. 7 shows a schematic of various metrics of statistics in the space of propagation of the wireless channel according to some embodiments of the present disclosure.

FIG. 7 shows a schematic of various metrics of statistics in the space of propagation of the wireless channel according to some embodiments of the present disclosure. For example, the space of propagation of the wireless signal can be represented as a Carterisan product of the set of possible angles of the directions of departure (DoD) of and angles of the directions of arrivals (DoA). The virtual angular-domain channel model can be pictorially represented as a two-dimensional grid 700, in which the DoA and DoD are represented with angles of arrival (AoA) 701 and angles of departure (AoD) 702 along the axis. A non-zero patch of energy 710 at, for example, AoA $\theta_2$ 711 and AoD $\phi_2$ 713, indicates that there is a path in the wireless channel such that a signal transmitted in the beam in the direction $\phi_2$ reaches receiver from the direction of $\theta_2$.

Figure 8:
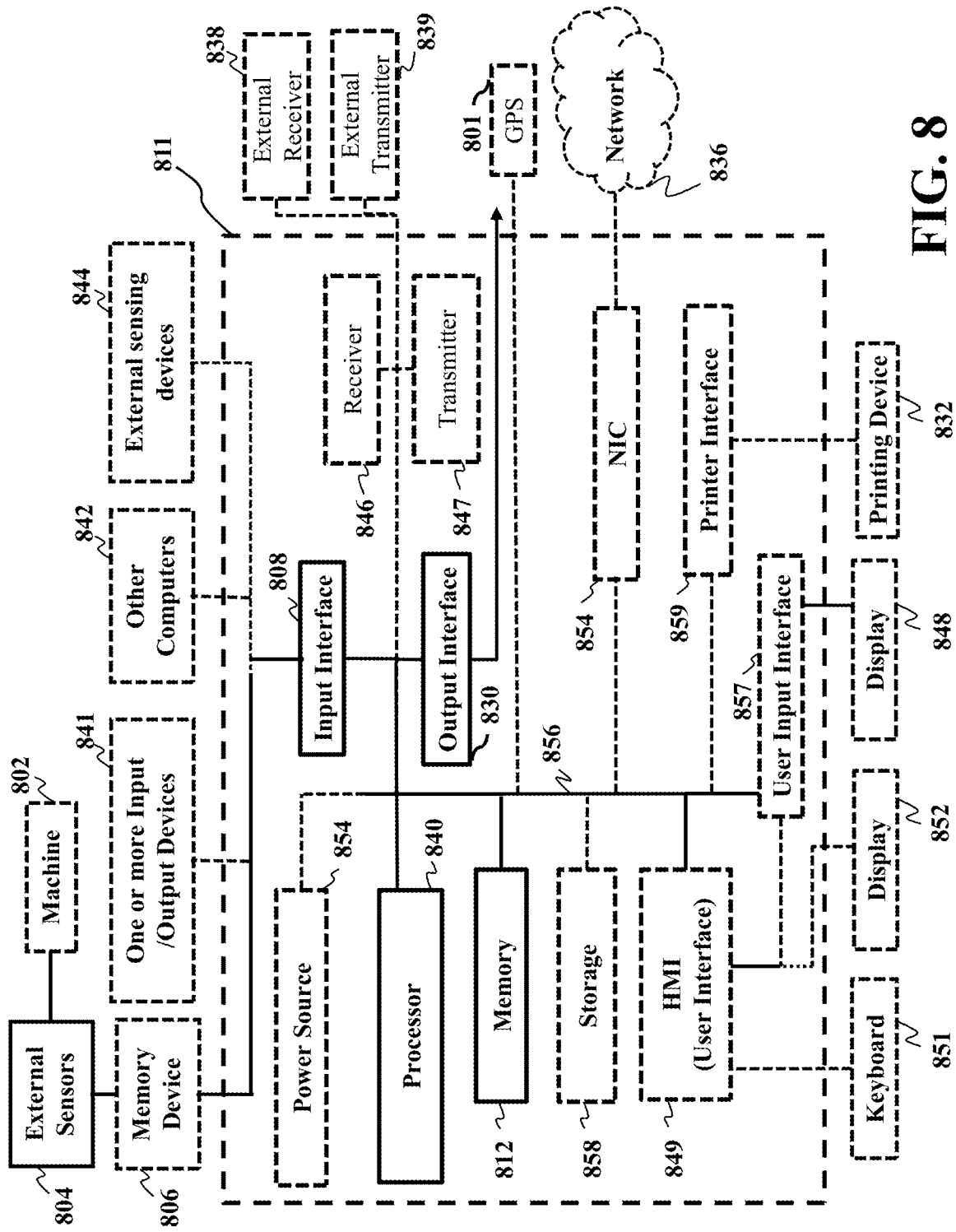
FIG. 8 is a block diagram of illustrating the method of FIG. 1A, that can be implemented using an alternate computer or processor, according to embodiments of the present disclosure.

FIG. 8 is a block diagram of illustrating the method of FIG. 1A, that can be implemented using an alternate controller, according to embodiments of the present disclosure. The controller 811 includes a processor 840, computer readable memory 812, storage 858 and user interface 849 with display 852 and keyboard 851, which are connected through bus 856. For example, the user interface 849 in communication with the processor 840 and the computer readable memory 812, acquires and stores the data in the computer readable memory 812 upon receiving an input from a surface, keyboard surface, of the user interface 857 by a user.

Contemplated is that the memory 812 can store instructions that are executable by the processor, historical data, and any data to that can be utilized by the methods and systems of the present disclosure. The processor 840 can be a single core processor, a multi-core processor, a computing cluster, or any number of other configurations. The processor 840 can be connected through a bus 856 to one or more input and output devices. The memory 812 can include random access memory (RAM), read only memory (ROM), flash memory, or any other suitable memory systems.

Still referring to FIG. 8, a storage device 858 can be adapted to store supplementary data and/or software modules used by the processor. For example, the storage device 858 can store historical data and other related data as mentioned above regarding the present disclosure. Additionally, or alternatively, the storage device 858 can store historical data similar to data as mentioned above regarding the present disclosure. The storage device 858 can include a hard drive, an optical drive, a thumb-drive, an array of drives, or any combinations thereof.

The system can be linked through the bus 856 optionally to a display interface (not shown) adapted to connect the system to a display device (not shown), wherein the display device can include a computer monitor, camera, television, projector, or mobile device, among others.

The controller 811 can include a power source 854, depending upon the application the power source 854 may be optionally located outside of the controller 811. Linked through bus 856 can be a user input interface 857 adapted to connect to a display device 848, wherein the display device 848 can include a computer monitor, camera, television, projector, or mobile device, among others. A printer interface 859 can also be connected through bus 856 and adapted to connect to a printing device 832, wherein the printing device 832 can include a liquid inkjet printer, solid ink printer, large-scale commercial printer, thermal printer, UV printer, or dye-sublimation printer, among others. A network interface controller (NIC) 834 is adapted to connect through the bus 856 to a network 836, wherein data or other data, among other things, can be rendered on a third party display device, third party imaging device, and/or third party printing device outside of the controller 811.

Still referring to FIG. 8, the data or other data, among other things, can be transmitted over a communication channel of the network 836, and/or stored within the storage system 858 for storage and/or further processing. Further, the data or other data may be received wirelessly or hard wired from a receiver 846 (or external receiver 838) or transmitted via a transmitter 847 (or external transmitter 839) wirelessly or hard wired, the receiver 846 and transmitter 847 are both connected through the bus 856. Further, a GPS 801 may be connected via bus 856 to the controller 811. The controller 811 may be connected via an input interface 808 to external sensing devices 844 and external input/output devices 841. The controller 811 may be connected to other external computers 842. An output interface 809 may be used to output the processed data from the processor 840.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A receiver for use in a wireless communication system to receive signals transmitted over a wireless channel, the receiver comprising:
    a plurality of antennas;
    a plurality of radio-frequency (RF) chains coupled the plurality of antennas, each RF chain includes a one-bit analog-to-digital converter (ADC) to convert each measurement of an analog signal received by the antenna into at least one bit of information representing a result of a comparison of the measurement with a randomly selected threshold to produce a sequence of bits and a corresponding sequence of thresholds, wherein each bit in the sequence of bits represents a relative value of the measurement of the analog signal with respect to a threshold from the corresponding sequence of thresholds;
    a processor coupled to the plurality of RF chains to estimate parameters of the wireless channel using the sequences of bits and the corresponding sequences of thresholds received from the plurality of RF chains, such that the parameters includes a two-dimensional channel matrix including angles-of-departure, angles-of-arrival, and channel path spreads, and wherein the parameters further comprise estimated channel state information (CSI), and that the processor is further configured to detect a received symbol using the estimated CSI; and a random-number generator to generate a random number within a predetermined range, wherein the processor selects the randomly selected threshold, based on the random number.

2. The receiver of claim 1, further comprising:
a memory to store a set of randomly selected thresholds, wherein the processor selects the threshold from the stored set of randomly selected thresholds based on the random number.

3. The receiver of claim 2, wherein values of the elements in the stored set of randomly selected thresholds are uniformly sampled.

4. The receiver of claim 2, wherein the stored set of randomly selected thresholds includes at least two elements with the same value.

5. The receiver of claim 2, wherein values of the elements in the stored set of randomly selected thresholds are sampled according a probability distribution function.

6. The receiver of claim 1, wherein the random-number generator generates the random number according to a probability distribution function.

7. The receiver of claim 1, further comprising:
a user input provided on a surface of at least one user input interface and received by the processor, such that the user input relates to the predetermined threshold range, wherein the random-number generator generates the random number within the provided predetermined range, and the processor selects the randomly selected thresholds based on the random number.

8. The receiver of claim 1, wherein the processor estimates, based on relative values of the measurements with respect to the randomly selected thresholds, a probability distribution function reflecting a density of the analog signal and selects the randomly selected thresholds using the probability distribution function.

9. The receiver of claim 1, wherein, for each time step, the processor selects the same threshold for all RF chains, or the processor selects different thresholds for at least some different RF chains.

10. The receiver of claim 9, wherein the processor selects a pattern of thresholds repeated from multiple groups of RF chains connected to neighboring antennas.

11. The receiver of claim 1, wherein the parameters includes elevation angles and their spread.

12. The receiver of claim 1, wherein the wireless channel is a millimeter wave channel, such that there are only a few propagation paths of the millimeter wave.

13. A decoder for use in a communication system to receive signals transmitted over a wireless channel, the decoder comprising:
a plurality of antennas;
a plurality of radio-frequency (RF) chains coupled the plurality of antennas, each RF chain includes an at least one-bit analog-to-digital converter (ADC) to convert each measurement of an analog signal received by the antenna into at least one bit of information representing a result of a comparison of the measurement with a randomly selected threshold to produce a sequence of bits and a corresponding sequence of thresholds, wherein each bit in the sequence of bits represents a relative value of the measurement of the analog signal with respect to a threshold from the corresponding sequence of thresholds;

a processor in communication with a memory, coupled to the plurality of RF chains to estimate parameters of the wireless channel using the sequences of bits and the corresponding sequences of thresholds received from the plurality of RF chains, such that the parameters include a two-dimensional channel matrix including angles-of-departure, angles-of-arrival, and channel path spreads, and that the processor is further configured to detect a received symbol using the estimated CSI; and a random-number generator to generate a random number within a predetermined range, such that the processor selects the randomly selected thresholds based on the random number.

14. The decoder of claim 13, wherein the selection of the randomly selected thresholds are correlated to a number of antennas of a massive multiple-input multiple-output (MIMO) system, completely irrelevant to the channel statistics or based on available prior knowledge on the channel statistics from past measurements, the geometry of the scene, and other knowledge sources.

15. A receiver for use in a wireless communication system to receive signals transmitted over a wireless channel, the receiver comprising:
a plurality of antennas;
a plurality of radio-frequency (RF) chains coupled the plurality of antennas, each RF chain includes a one-bit analog-to-digital converter (ADC) to convert each measurement of an analog signal received by the antenna into at least one bit of information representing a result of a comparison of the measurement with a randomly selected threshold to produce a sequence of bits and a corresponding sequence of thresholds, wherein each bit in the sequence of bits represents a relative value of the measurement of the analog signal with respect to a threshold from the corresponding sequence of thresholds; and
a processor coupled to the plurality of RF chains to estimate parameters of the wireless channel using the sequences of bits and the corresponding sequences of thresholds received from the plurality of RF chains,
wherein the processor estimates the parameters of the wireless channel according to a maximum likelihood criterion $$\ln p(z \mid \psi) = \sum_{m=1}^{2KN_r} \ln \Phi\left(z_m \frac{\Gamma_m^T \bar{h} - \lambda_m}{\delta/\sqrt{2}}\right),$$

wherein $z_m$ is a quantized I/Q signals at a m-th receiving antenna, $\Gamma_m^T$ denotes an m-th row of the matrix $\Gamma$ which is a function of a pilot symbol, an angle-of-departure, an angle-of-arrival, and an antenna geometry, $\bar{h}$ is a vector that contains a real and imaginary parts of a complex channel path gains, $\lambda_m$ is the threshold used at the m-th receiving antenna at a given time instance, $\sigma$ is a noise standard deviation, $\Phi(\cdot)$ is a cumulative density function (CDF) of a standard Gaussian random variable, K is a number of pilot symbols, $N_r$ is a number of receiving antennas, and $\psi$ groups all unknown wireless channel statistics including an angle-of-departure, an angle-of-arrival, a complex channel path gain, and their angular spreads.

\* \* \* \* \*